(12) United States Patent
Speks et al.

(10) Patent No.: US 12,462,045 B2
(45) Date of Patent: Nov. 4, 2025

(54) STORAGE PROVISIONING

(71) Applicant: Telefonaktiebolaget LM Ericsson (publ), Stockholm (SE)

(72) Inventors: Oliver Speks, Eschweiler (DE); Raphael Quinet, Liège (BE); Nikolas Hermanns, Heinsberg (DE); Georg Kunz, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 17/796,363

(22) PCT Filed: Feb. 7, 2020

(86) PCT No.: PCT/EP2020/053218
§ 371 (c)(1),
(2) Date: Jul. 29, 2022

(87) PCT Pub. No.: WO2021/155958
PCT Pub. Date: Aug. 12, 2021

(65) Prior Publication Data
US 2023/0062517 A1    Mar. 2, 2023

(51) Int. Cl.
*G06F 21/60*    (2013.01)
*G06F 3/06*    (2006.01)
*G06F 21/62*    (2013.01)

(52) U.S. Cl.
CPC .......... *G06F 21/602* (2013.01); *G06F 3/0622* (2013.01); *G06F 3/0655* (2013.01); *G06F 3/0673* (2013.01); *G06F 21/6218* (2013.01)

(58) Field of Classification Search
CPC .... G06F 21/602; G06F 3/0622; G06F 3/0655; G06F 3/0673; G06F 21/6218;
(Continued)

(56) References Cited

U.S. PATENT DOCUMENTS

| 10,372,926 B1 | 8/2019 | Leshinsky et al. |
| 2008/0034199 A1 | 2/2008 | Nair et al. |

(Continued)

FOREIGN PATENT DOCUMENTS

| CN | 101410850 A | 4/2009 |
| CN | 103299315 A | 9/2013 |

(Continued)

OTHER PUBLICATIONS

"First Office Action", Chinese Patent Application No. 202080094627.1, Dec. 23, 2024, 1-9.

(Continued)

*Primary Examiner* — Javier O Guzman
(74) *Attorney, Agent, or Firm* — Murphy, Bilak & Homiller, PLLC

(57) ABSTRACT

There is provided a method performed by a first storage provisioning node of a system for provisioning storage in the system. In response to a first request for an encrypted storage volume for an application node, transmission of a second request is initiated (20) towards a second storage provisioning node for an unencrypted storage volume. In response to the requested unencrypted storage volume becoming available to the first storage provisioning node, an encrypted storage volume is generated (22) from the unencrypted storage volume and provisioning of the encrypted storage volume is initiated (24) to make the encrypted storage volume available at a compute node of the system for use by the application node.

20 Claims, 17 Drawing Sheets

(58) Field of Classification Search
CPC ...... G06F 3/0638; G06F 3/067; G06F 3/0623; H04L 67/1097; H04L 63/0428
See application file for complete search history.

(56) References Cited

U.S. PATENT DOCUMENTS

| | | |
|---|---|---|
| 2008/0080706 A1 | 4/2008 | Ikeuchi et al. |
| 2008/0082835 A1* | 4/2008 | Asher .................. G06F 21/78 713/193 |
| 2010/0211802 A1 | 8/2010 | Humphries et al. |
| 2014/0351391 A1 | 11/2014 | Madani et al. |
| 2017/0060918 A1* | 3/2017 | Iyer ...................... G06F 3/0685 |
| 2019/0114102 A1* | 4/2019 | Chen .................... G06F 3/0604 |
| 2019/0213319 A1* | 7/2019 | Gerebe ................. H04L 63/12 |
| 2019/0220361 A1* | 7/2019 | Mageswaran ......... G06F 11/302 |
| 2019/0354710 A1* | 11/2019 | Leshinsky ............. H04L 9/0861 |
| 2021/0103395 A1* | 4/2021 | Yankovskiy .......... G06F 3/0604 |

FOREIGN PATENT DOCUMENTS

| | | | |
|---|---|---|---|
| EP | 1770951 A1 | 4/2007 | |
| WO | WO-2008037741 A1 * | 4/2008 | ............. G06F 21/78 |

OTHER PUBLICATIONS

Aiping, Yu, "Overview of Data Encryption Methods to Ensure Shared Data Security", Network Security Technology and Application, Oct. 15, 2015, 1-31.

The Kubernetes Authors, "Storage Classes", Concepts, <https://kubernetes.io/docs/concepts/storage/storage-classes/#provisioner>, The Linux Foundation, Jan. 9, 2020, 1-22.

* cited by examiner

Initiate provisioning of the unencrypted storage volume to make the unencrypted storage volume available at a compute node of the system to the first storage provisioning node — 50

Figure 8

STORAGE PROVISIONING

TECHNICAL FIELD

The disclosure relates to methods for provisioning storage in a system and nodes configured to operate in accordance with those methods.

BACKGROUND

Applications (e.g. in the fifth generation (5G) core network) are increasingly following cloud native design principles and are being deployed in container-based data centers. Upon request, container-based data centers can provide persistent storage volumes to container workloads. These persistent storage volumes are provided using a component that is referred to as a storage provisioner or storage provisioning node.

FIGS. 1 and 2 illustrate existing systems comprising such a storage provisioning node 510, which provides storage volumes to workloads.

Generally, data centers have a range of compute nodes (or hosts) 300 on which workloads are executed. As illustrated in FIGS. 1 and 2, a compute node 300 often comprises processing circuitry (e.g. a processor) 310, a memory 320, a network interface 330 and optionally a storage interface 340. The workloads running on the compute node 300 share an operating system (OS) 350. In some existing systems, such as the existing system illustrated in FIG. 1, storage is provided by a storage backend 500, which is attached to the compute node 300 through a network using the network interface 330. In these existing systems, the storage backend 500 comprises the storage provisioning node 510. In other existing systems, such as the existing system illustrated in FIG. 2, storage is directly attached by means of the storage interface 340 to the compute node 300. In these existing systems, the OS 350 of the compute node 300 comprises the storage provisioning node 510.

In the existing systems illustrated in FIGS. 1 and 2, all data center resources are allocated to workloads by an orchestrator (e.g. a container cluster orchestrator) 400. The orchestrator 400 comprises a workload orchestrator 410 that orchestrates compute resources. The orchestrator 400 also comprises a storage orchestrator 420 that orchestrates storage resources. The workload orchestrator 410 and the storage orchestrator 420 can communicate via an interface 430. In the existing systems illustrated in FIGS. 1 and 2, workloads run within an application node (e.g. an application container or workload container) 100. Typically, several application nodes (e.g. application containers or workload containers) 100 run on the same compute node 300. Each of these application nodes 100 can request one or more storage volumes 360. The storage needs of a storage consumer (e.g. a user or an application) 120 that requires data storage are expressed within a request 110 that is processed by the orchestrator 400 at the time of application node deployment.

The workload orchestrator 410 uses the storage orchestrator 420 to request storage from the storage provisioning node 510. The storage provisioning node 510 maintains a pool of storage devices 520, reserves the requested amount of storage and makes it available to the compute node 300. The storage orchestrator 420 uses an interface 440 to the OS 350 on the compute node 300 to create a storage volume 360 that is accessible to the storage consumer 120.

FIGS. 3 and 4 are signalling (or call flow) diagrams illustrating an exchange of signals in an existing system, such as those illustrated in FIGS. 1 and 2. The existing system illustrated in FIGS. 3 and 4 comprises the application node 100, the OS 350 of the compute node 300, the storage provisioning node 510, the orchestrator 400, and an application management node 600.

With reference to FIG. 3, as illustrated by arrow 700, in existing systems, the application management node 600 transmits a deployment request towards the orchestrator 400. The deployment request is a request to deploy an application node (e.g. an application container or workload container) 100. In response to the deployment request, as illustrated by arrow 702 of FIG. 3, the orchestrator 400 transmits a request for storage towards the storage provisioning node 510. As illustrated by arrow 704 of FIG. 3, in response to this request, the storage provisioning node 510 transmits a request towards the OS 350 for the OS 350 to mount the storage volume 360. As illustrated at block 706 of FIG. 3, the OS 350 mounts the storage volume 360 to the compute node 300 and thus the storage volume 360 becomes available to the application node 100 (or, more specifically, the storage consumer 120).

As illustrated by arrow 708 of FIG. 3, the request for storage may be acknowledged by the storage provisioning node 510 to the orchestrator 400. As illustrated by arrow 710 of FIG. 3, the orchestrator 400 transmits a request towards the OS 350, which is a request for the OS 350 to create the application node 100. Then, the OS 350 allocates central processing unit (CPU) time for the application node 100 to run. Thus, as illustrated by arrow 712 of FIG. 3, the OS 350 transmits a request towards the application node 100, which is a request for the application node 100 to start. At block 714 of FIG. 3, the application node 100 uses (or consumes) the storage volume 360.

With reference to FIG. 4, as illustrated by arrow 800, a decommissioning request is received by the orchestrator 400 from the application management node 600. In response to the decommissioning request, the orchestrator 400 transmits a request towards the OS 350 to decommission (e.g. delete) the application node (e.g. container) 100. As illustrated by arrow 802 of FIG. 4, the orchestrator 400 may transmit a request towards the (e.g. operating system 350 of the) application node 100 for the application node 100 to be decommissioned (e.g. deleted).

As illustrated by arrow 804 of FIG. 4, the application management node 600 may transmit a request towards the orchestrator 400 for the storage volume to be deleted. In response to this request, as illustrated by arrow 806, the orchestrator 400 transmits a request towards the storage provisioning node 510 for the storage provisioning node 510 to delete the storage volume. In response to this request, as illustrated by arrow 808, the storage provisioning node 510 transmits a request to the OS 350 of the compute node 300 for the compute node 300 to unmount the storage volume. In response to this request, as illustrated at block 810, the OS 350 of the compute node 300 unmounts the storage volume, such that it becomes unavailable to the application node 100. As illustrated by arrow 812 of FIG. 4, the request to delete the storage volume may be acknowledged by the storage provisioning node 510 to the orchestrator 400.

In existing systems for provisioning storage, such as those described with reference to FIGS. 1, 2, 3 and 4, data encryption has become mandatory in order for applications to comply with legal requirements related to personal data protection (e.g. the General Data Protection Regulation (GDPR)) and security. However, most of the storage provisioning node components that are currently available do not actually support volume encryption. Also, for databases that do not have built-in encryption functionality, it is desirable for the system infrastructure to provide encryption of data at rest. However, applications (e.g. 5G applications) are often deployed in different data centers for which the system infrastructure is not always fully controlled by a single party. Instead, it is usually necessary to work with different storage provisioning nodes, but most of these storage provisioning nodes do not actually support the encryption that is expected by the databases.

One solution to this is to implement similar software in a multitude of components in the system infrastructure. However, this creates recurring development costs, since similar software then needs to be created and implemented for every new component that is added to the system infrastructure and for every new application release. The application release dependency applies to encryption implemented in application nodes (e.g. application containers or workload containers). In this respect, encryption related software may be added to the application nodes (e.g. application containers or workload containers). However, this can lead to licensing and support problems, particularly if these application nodes are third party products. Furthermore this creates recurring development costs, since similar software then needs to be created and implemented in every application that uses encrypted storage. It is also not acceptable to wait until all relevant storage provisioning nodes have been updated to support volume level encryption. There is no standard on how an encryption key may be passed to the storage provisioning node. Moreover, even if a storage provisioning node integrated in a data center supports encryption, the application needs to be adapted for each storage provisioning node that supports encryption to convey the key in the respective proprietary way.

SUMMARY

It is an object of the disclosure to obviate or eliminate at least some of the above-described disadvantages associated with existing systems.

Therefore, according to an aspect of the disclosure, there is provided a method for provisioning storage in a system. This method is performed by a first storage provisioning node of the system. The method comprises, in response to a first request for an encrypted storage volume for an application node, initiating transmission of a second request towards a second storage provisioning node for an unencrypted storage volume. The method also comprises, in response to the requested unencrypted storage volume becoming available to the first storage provisioning node, generating an encrypted storage volume from the unencrypted storage volume and initiating provisioning of the encrypted storage volume to make the encrypted storage volume available at a compute node of the system for use by the application node.

There is thus provided an advantageous method for provisioning storage in a system. In particular, the method supports volume level encryption. This encryption on a volume level allows finer granularity for the creation of security domains, for example, compared with storage encryption performed on device level. It allows every volume to be encrypted with a different key. Moreover, the method allows security requirements on storage encryption to be satisfied without being dependent on encryption functionality provided by cloud systems. It is possible to provide encrypted storage volumes to application nodes even if a data center does not support such functionality. The method also avoids the need for software to be created (or modified) and implemented for every new storage provisioning node that is added to the system infrastructure and/or for every new application release, which provides easier development and integration. Moreover, licensing and support issues are mitigated since the method does not require encryption related software to be added to third party application nodes. The encrypted storage that is provide by way of the method can be used by any application node and can be deployed independently of any application node. It requires only a minimal additional software footprint irrespective of the number of application nodes that use it and no extra storage footprint. There is also no impact on application nodes if the second storage provisioning node is replaced with a different one. Moreover, different to encryption of data at rest on an infrastructure level, it allows the creation of different security domains on a per storage volume basis, e.g. by encrypting volumes with individual keys.

In some embodiments, initiating provisioning of the encrypted storage volume to make the encrypted storage volume available at the compute node for use by the application node may comprise initiating mounting of the encrypted storage volume to the compute node to make the encrypted storage volume available at the compute node for use by the application node. In this way, it is possible to make storage volumes accessible in a root file system tree, which can be a precondition for using functionality provided by the operating system of the compute node to access storage, such as reading and/or writing.

In some embodiments, initiating mounting of the encrypted storage volume to the compute node may comprise initiating mounting of the encrypted storage volume to a directory tree of the compute node. This can be particularly advantageous when the encrypted storage volume needs to be made available to multiple application nodes on the same compute host. In particular, having a separate mount point simplifies adding and removing of application node specific mount points.

In some embodiments, initiating provisioning of the encrypted storage volume to make the encrypted storage volume available at the compute node for use by the application node may comprise initiating provisioning of the encrypted storage volume on the first storage provisioning node to make the encrypted storage volume available at the compute node.

In some embodiments, the method may comprise initiating transmission of a third request towards the second storage provisioning node to cease making the unencrypted storage volume available at the compute node. This can be particularly advantageous where storage volumes can only be mounted to one compute node at a time. For example, unmounting of storage volumes may then be a precondition for mounting them to a different compute node. In general, the freeing up of unused resources improves efficiency of resource usage.

In some embodiments, the method may comprise, in response to a fourth request to cease making the encrypted storage volume available at the compute node, initiating the ceasing of making the encrypted storage volume available at the compute node. This may be advantageous since, depending on the operating system on the compute host, unmounting of the encrypted volume may be a precondition for unmounting of the unencrypted volume. It can also free up unused resources to thereby improve the efficiency of resource usage.

In some embodiments, the encrypted storage volume may be generated by applying an encrypted layer to the unencrypted storage volume.

In some embodiments, the encrypted layer may be an encrypted file system layer.

According to another aspect of the disclosure, there is provided a first storage provisioning node. The first storage provisioning node comprises processing circuitry configured to operate in accordance with the method described earlier in respect of the first storage provisioning node. The first storage provisioning node thus provides the advantages discussed earlier in respect of the method performed by the first storage provisioning node. In some embodiments, the first storage provisioning node comprises at least one memory for storing instructions which, when executed by the processing circuitry, cause the first storage provisioning node to operate in accordance with the method described earlier in respect of the first storage provisioning node.

According to another aspect of the disclosure, there is provided another method for provisioning storage in a system. This method is performed by a second storage provisioning node of the system. The method comprises, in response to a second request from a first storage provisioning node of the system for an unencrypted storage volume, initiating provisioning of the unencrypted storage volume to make the unencrypted storage volume available to the first storage provisioning node at a compute node of the system to the first storage provisioning node for the first storage provisioning node to use in the generation of an encrypted storage volume to be made available at the compute node for use by an application node.

There is thus provided an advantageous method for provisioning storage in a system. In particular, the method supports volume level encryption. This encryption on a volume level allows finer granularity for the creation of security domains, for example, compared with storage encryption performed on device level. It allows every volume to be encrypted with a different key. Moreover, the method allows security requirements on storage encryption to be satisfied without being dependent on encryption functionality provided by cloud systems. It is possible to provide encrypted storage volumes to application nodes even if a data center does not support such functionality. The method also avoids the need for software to be created (or modified) and implemented for every new storage provisioning node that is added to the system infrastructure and/or for every new application release, which provides easier development and integration. Moreover, licensing and support issues are mitigated since the method does not require encryption related software to be added to third party application nodes. The encrypted storage that is provided by way of the method can be used by any application node and can be deployed independently of any application node. It requires only a minimal additional software footprint irrespective of the number of applications that use it and no extra storage footprint. There is also no impact on application nodes if the second storage provisioning node is replaced with a different one. Moreover, different to encryption of data at rest on an infrastructure level, it allows the creation of different security domains on a per storage volume basis, e.g. by encrypting volumes with individual keys.

In some embodiments, initiating provisioning of the unencrypted storage volume to make the unencrypted storage volume available to the first storage provisioning node at the compute node to the first storage provisioning node may comprise initiating mounting of the unencrypted storage volume to the compute node to make the unencrypted storage volume available to the first storage provisioning node.

In some embodiments, initiating provisioning of the unencrypted storage volume to make the unencrypted storage volume available to the first storage provisioning node at the compute node to the first storage provisioning node may comprise initiating generating of a container on which to make the unencrypted storage volume available at the compute node. This can be particularly advantageous where it is not possible to mount storage volumes to already running containers.

In some embodiments, the compute node may be separate to the second storage provisioning node. In this way, performance dependencies between storage and application nodes running on the compute nodes can be avoided. In some embodiments, the compute node may comprise the second storage provisioning node. This allows easier scaling of the storage solution and reduces hardware cost by avoiding dedicated storage hardware and instead allows to make use of only one type of compute node (e.g. server) for the application nodes and storage.

In some embodiments, the method may comprise, in response to a third request from the first storage provisioning node to cease making the unencrypted storage volume available at the compute node, initiating the ceasing of making the unencrypted storage volume available at the compute node. In this way, unused resources can be freed up to thereby improve efficiency of resource usage on the compute node.

In some embodiments, initiating the ceasing of making the unencrypted storage volume available at the compute node may comprise initiating unmounting of the unencrypted storage volume from the compute node. This can be particularly advantageous where storage volumes can only be mounted to one compute node at a time. For example, unmounting storage volumes may then be a precondition for mounting them to a different compute node. It can also free up unused resources to thereby improve efficiency of resource usage.

According to another aspect of the disclosure, there is provided a second storage provisioning node. The second storage provisioning node comprises processing circuitry configured to operate in accordance with the method described earlier in respect of the second storage provisioning node. The second storage provisioning node thus provides the advantages discussed earlier in respect of the method performed by the second storage provisioning node. In some embodiments, the second storage provisioning node comprises at least one memory for storing instructions which, when executed by the processing circuitry, cause the second storage provisioning node to operate in accordance with the method described earlier in respect of the second storage provisioning node.

According to another aspect of the disclosure, there is provided another method for provisioning storage in a system. This method is performed by a compute node of the system. The method comprises provisioning an unencrypted storage volume requested by a first storage provisioning node to make the unencrypted storage volume available to the first storage provisioning node at the compute node to the first storage provisioning node for the first storage provisioning node to use in the generation of an encrypted storage volume. The method also comprises provisioning the encrypted storage volume generated by the first storage provisioning node to make the encrypted storage volume available at the compute node for use by an application node.

There is thus provided an advantageous method for provisioning storage in a system. In particular, the method supports volume level encryption. This encryption on a volume level allows finer granularity for the creation of security domains, for example, compared with storage encryption performed on device level. It allows every volume to be encrypted with a different key. Moreover, the method allows security requirements on storage encryption to be satisfied without being dependent on encryption functionality provided by cloud systems. It is possible to provide encrypted storage volumes to application nodes even if a data center does not support such functionality. The method also avoids the need for software to be created (or modified) and implemented for every new storage provisioning node that is added to the system infrastructure and/or for every new application release, which provides easier development and integration. Moreover, licensing and support issues are mitigated since the method does not require encryption related software to be added to third party application nodes. The encrypted storage that is provided by way of the method can be used by any application node and can be deployed independently of any application node. It requires only a minimal additional software footprint irrespective of the number of application nodes that use it and no extra storage footprint. There is also no impact on application nodes if the second storage provisioning node is replaced with a different one. Moreover, different to encryption of data at rest on an infrastructure level, it allows the creation of different security domains on a per storage volume basis, e.g. by encrypting volumes with individual keys.

In some embodiments, provisioning the unencrypted storage volume to make the unencrypted storage volume available at the compute node may comprise generating a container on which to make the unencrypted storage volume available at the compute node. This can be particularly advantageous where it is not possible to mount storage volumes to already running containers. In some embodiments, provisioning the unencrypted storage volume to make the unencrypted storage volume available at the compute node may comprise provisioning the encrypted storage volume to make the encrypted storage volume available at the compute node may comprise provisioning the encrypted storage volume on the first storage provisioning node to make the encrypted storage volume available at the compute node.

In some embodiments, provisioning the unencrypted storage volume to make the unencrypted storage volume available to the first storage provisioning node at the compute node to the first storage provisioning node may comprise mounting the unencrypted storage volume to the compute node to make the unencrypted storage volume available to the first storage provisioning node and/or provisioning the encrypted storage volume to make the encrypted storage volume available at the compute node for use by the application node may comprise mounting the encrypted storage volume to the compute node to make the encrypted storage volume available at the compute node for use by the application node.

In some embodiments, mounting the unencrypted storage volume to the compute node may comprise mounting the unencrypted storage volume to a directory tree of the compute node and/or mounting the encrypted storage volume to the compute node may comprise mounting the encrypted storage volume to the directory tree of the compute node. This can be particularly advantageous when the encrypted storage volume needs to be made available to multiple application nodes on the same compute host. In particular, having a separate mount point simplifies adding and removing of application node specific mount points.

In some embodiments, the method may comprise ceasing to make the encrypted storage volume available at a compute node and/or ceasing to make the unencrypted storage volume available at the compute node. In this way, unused resources can be freed up to thereby improve efficiency of resource usage on the compute node.

In some embodiments, ceasing to make the encrypted storage volume available at the compute node may comprise unmounting the encrypted storage volume from the compute node and/or ceasing to make the unencrypted storage volume available at the compute node may comprise unmounting the unencrypted storage volume from the compute node. This can be particularly advantageous when the application node that consumes the encrypted volume is terminated on the compute node, for example, due to decommissioning of the application node or an orchestrator deciding to run the application node on a different compute node.

In some embodiments, ceasing to make the encrypted storage volume available at the compute node and/or ceasing to make the unencrypted storage volume available at the compute node may be in response to a trigger.

In some embodiments, the compute node may be separate to a second storage provisioning node of the system. In this way, performance dependencies between storage and application nodes running on the compute nodes can be avoided. In some embodiments, the compute node may comprise a second storage provisioning node of the system. This allows easier scaling of the storage solution and reduces hardware cost by avoiding dedicated storage hardware and instead allows to make use of only one type of compute node (e.g. server) for the application nodes and storage.

According to another aspect of the disclosure, there is provided a compute node. The compute node comprises processing circuitry configured to operate in accordance with the method described earlier in respect of the compute node. The compute node thus provides the advantages discussed earlier in respect of the method performed by the compute node. In some embodiments, the compute node comprises at least one memory for storing instructions which, when executed by the processing circuitry, cause the compute node to operate in accordance with the method described earlier in respect of the compute node.

According to another aspect of the disclosure, there is provided a system. The system comprises one or more first storage provisioning nodes as described earlier, one or more second storage provisioning nodes as described earlier and/or one or more compute nodes as described earlier. The system thus provides the advantages discussed earlier in respect of the method performed by the first storage provisioning node, second storage provisioning node and/or compute node.

According to another aspect of the disclosure, there is provided a computer program comprising instructions which, when executed by processing circuitry, cause the processing circuitry to perform the method described earlier in respect of the first storage provisioning node, second storage provisioning node and/or compute node. The computer program thus provides the advantages discussed earlier in respect of the method performed by the first storage provisioning node, second storage provisioning node and/or compute node.

According to another aspect of the disclosure, there is provided a computer program product, embodied on a non-transitory machine-readable medium, comprising instructions which are executable by processing circuitry to cause the processing circuitry to perform the method described earlier in respect of the first storage provisioning node, second storage provisioning node and/or compute node. The computer program product thus provides the advantages discussed earlier in respect of the method performed by the first storage provisioning node, second storage provisioning node and/or compute node.

Therefore, an advantageous technique for provisioning storage in a system is provided.

BRIEF DESCRIPTION OF THE DRAWINGS

For a better understanding of the technique, and to show how it may be put into effect, reference will now be made, by way of example, to the accompanying drawings, in which:

FIG. 8 is a block diagram illustrating a method performed by a second storage provisioning node according to an embodiment.

DETAILED DESCRIPTION

As mentioned earlier, an advantageous technique for provisioning storage in a system is described herein. More specifically, the technique described herein provisions storage volumes in a network. Herein, a storage volume can be any unit of storage. The storage volumes referred to herein can be configured to store data, information, objects, etc. In some embodiments, a storage volume may be a file system. The technique described herein is implemented by a first storage provisioning node, a second storage provisioning node and a compute node.

The technique described herein may, for example, be applied to data centers, such as data centers that use container technology. These data centers that use container technology may also be referred to as cloud data centers. Generally, workloads may be distributed over multiple containers. The multiple containers can be scheduled to execute on a plurality of compute nodes (or hosts). An agent of a storage provisioner may be present on each compute node. The agent may communicate with an operating system of the compute node.

According to some embodiments, the system described herein for which storage is provisioned may comprise a plurality of compute nodes that are configured in the manner described herein. A plurality of compute nodes may also be referred to as a cluster. Herein, provisioning storage or storage provisioning can be defined as the process of assigning storage and making that storage available to an application node, e.g. for read and/or write operations.

Figure 5:
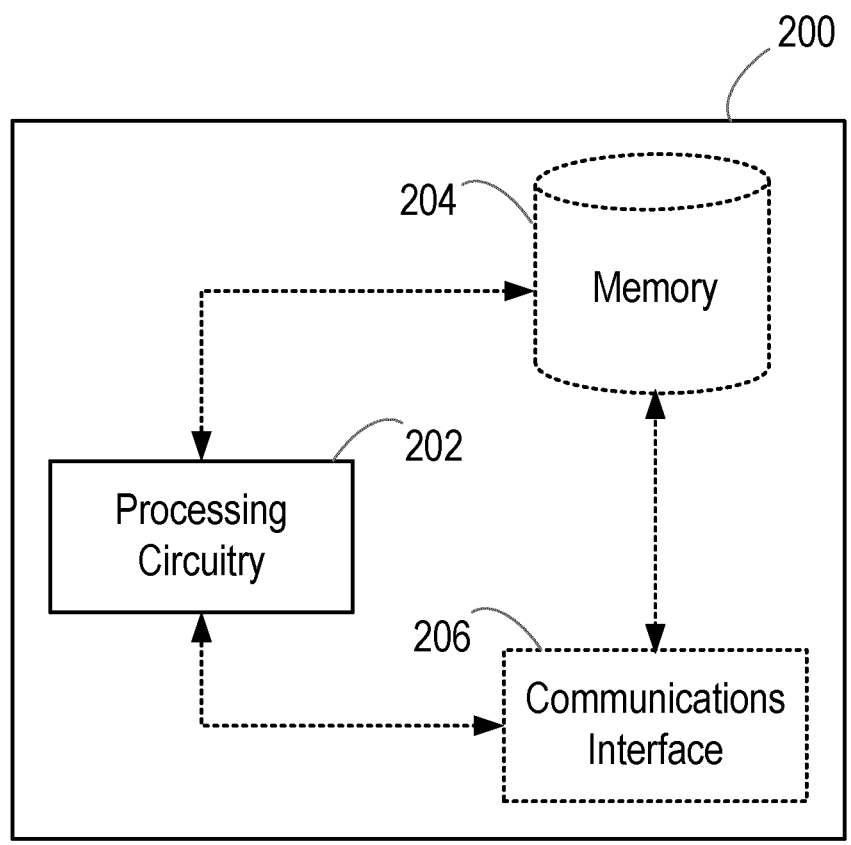
FIG. 5 is a block diagram illustrating a first storage provisioning node according to an embodiment.

FIG. 5 illustrates a first storage provisioning node 200 of a system in accordance with an embodiment. The first storage provisioning node 200 is for provisioning storage in the system. The first storage provisioning node 200 may, for example, be a physical machine (e.g. a server) or a virtual machine (VM). The first storage provisioning node 200 may be any generic storage provisioner.

As illustrated in FIG. 5, the first storage provisioning node 200 comprises processing circuitry (or logic) 202. The processing circuitry 202 controls the operation of the first storage provisioning node 200 and can implement the method described herein in respect of the first storage provisioning node 200. The processing circuitry 202 can be configured or programmed to control the first storage provisioning node 200 in the manner described herein. The processing circuitry 202 can comprise one or more hardware components, such as one or more processors, one or more processing units, one or more multi-core processors, and/or one or more modules. In particular implementations, each of the one or more hardware components can be configured to perform, or is for performing, individual or multiple steps of the method described herein in respect of the first storage provisioning node 200. In some embodiments, the processing circuitry 202 can be configured to run software to perform the method described herein in respect of the first storage provisioning node 200. The software may be containerised according to some embodiments. Thus, in some embodiments, the processing circuitry 202 may be configured to run a container to perform the method described herein in respect of the first storage provisioning node 200. This container may run in privileged mode.

Briefly, the processing circuitry 202 of the first storage provisioning node 200 is configured to, in response to a first request for an encrypted storage volume for an application node, initiate transmission of a second request towards a second storage provisioning node for an unencrypted storage volume. The processing circuitry 202 of the first storage provisioning node 200 is also configured to, in response to the requested unencrypted storage volume becoming available to the first storage provisioning node, generate an encrypted storage volume from the unencrypted storage volume and initiate provisioning of the encrypted storage volume to make the encrypted storage volume available at a compute node of the system for use by the application node. The first storage provisioning node 200 described herein acts as a shim.

As illustrated in FIG. 5, in some embodiments, the first storage provisioning node 200 may optionally comprise a memory 204. The memory 204 of the first storage provisioning node 200 can comprise a volatile memory or a non-volatile memory. In some embodiments, the memory 204 of the first storage provisioning node 200 may comprise a non-transitory media. Examples of the memory 204 of the first storage provisioning node 200 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 202 of the first storage provisioning node 200 can be connected to the memory 204 of the first storage provisioning node 200. In some embodiments, the memory 204 of the first storage provisioning node 200 may be for storing program code or instructions which, when executed by the processing circuitry 202 of the first storage provisioning node 200, cause the first storage provisioning node 200 to operate in the manner described herein in respect of the first storage provisioning node 200. For example, in some embodiments, the memory 204 of the first storage provisioning node 200 may be configured to store program code or instructions that can be executed by the processing circuitry 202 of the first storage provisioning node 200 to cause the first storage provisioning node 200 to operate in accordance with the method described herein in respect of the first storage provisioning node 200. Alternatively or in addition, the memory 204 of the first storage provisioning node 200 can be configured to store any information, data, messages, requests, responses, indications, notifications, signals, or similar, that are described herein. The processing circuitry 202 of the first storage provisioning node 200 may be configured to control the memory 204 of the first storage provisioning node 200 to store information, data, messages, requests, responses, indications, notifications, signals, or similar, that are described herein.

In some embodiments, as illustrated in FIG. 5, the first storage provisioning node 200 may optionally comprise a communications interface 206. The communications interface 206 of the first storage provisioning node 200 can be connected to the processing circuitry 202 of the first storage provisioning node 200 and/or the memory 204 of first storage provisioning node 200. The communications interface 206 of the first storage provisioning node 200 may be operable to allow the processing circuitry 202 of the first storage provisioning node 200 to communicate with the memory 204 of the first storage provisioning node 200 and/or vice versa. Similarly, the communications interface 206 of the first storage provisioning node 200 may be operable to allow the processing circuitry 202 of the first storage provisioning node 200 to communicate with the second storage provisioning node, compute node and/or any other node. The communications interface 206 of the first storage provisioning node 200 can be configured to transmit and/or receive information, data, messages, requests, responses, indications, notifications, signals, or similar, that are described herein. In some embodiments, the processing circuitry 202 of the first storage provisioning node 200 may be configured to control the communications interface 206 of the first storage provisioning node 200 to transmit and/or receive information, data, messages, requests, responses, indications, notifications, signals, or similar, that are described herein.

Although the first storage provisioning node 200 is illustrated in FIG. 5 as comprising a single memory 204, it will be appreciated that the first storage provisioning node 200 may comprise at least one memory (i.e. a single memory or a plurality of memories) 204 that operate in the manner described herein. Similarly, although the first storage provisioning node 200 is illustrated in FIG. 5 as comprising a single communications interface 206, it will be appreciated that the first storage provisioning node 200 may comprise at least one communications interface (i.e. a single communications interface or a plurality of communications interface) 206 that operate in the manner described herein.

It will also be appreciated that FIG. 5 only shows the components required to illustrate an embodiment of the first storage provisioning node 200 and, in practical implementations, the first storage provisioning node 200 may comprise additional or alternative components to those shown.

In some embodiments, the hardware (e.g. processing circuitry 202, memory 204, and/or communications interface 206) that can implement the method described herein in respect of the first storage provisioning node 200 may be the same hardware as that which implements the method performed by an application node. For example, the same hardware (e.g. processing circuitry, memory, and/or communications interface) of the application node that is configured to run at least part of one or more applications may also be configured to implement the method described herein in respect of the first storage provisioning node 200. In some embodiments, the hardware that can implement the method described herein in respect of the first storage provisioning node 200 and/or the hardware that can implement the method described herein in respect of the application node may be the same hardware as that which implements the method performed by a compute node (e.g. of a cluster of compute nodes), such as the compute node described herein. The application node referred to herein may be configured to run at least part of one or more applications.

Figure 6:
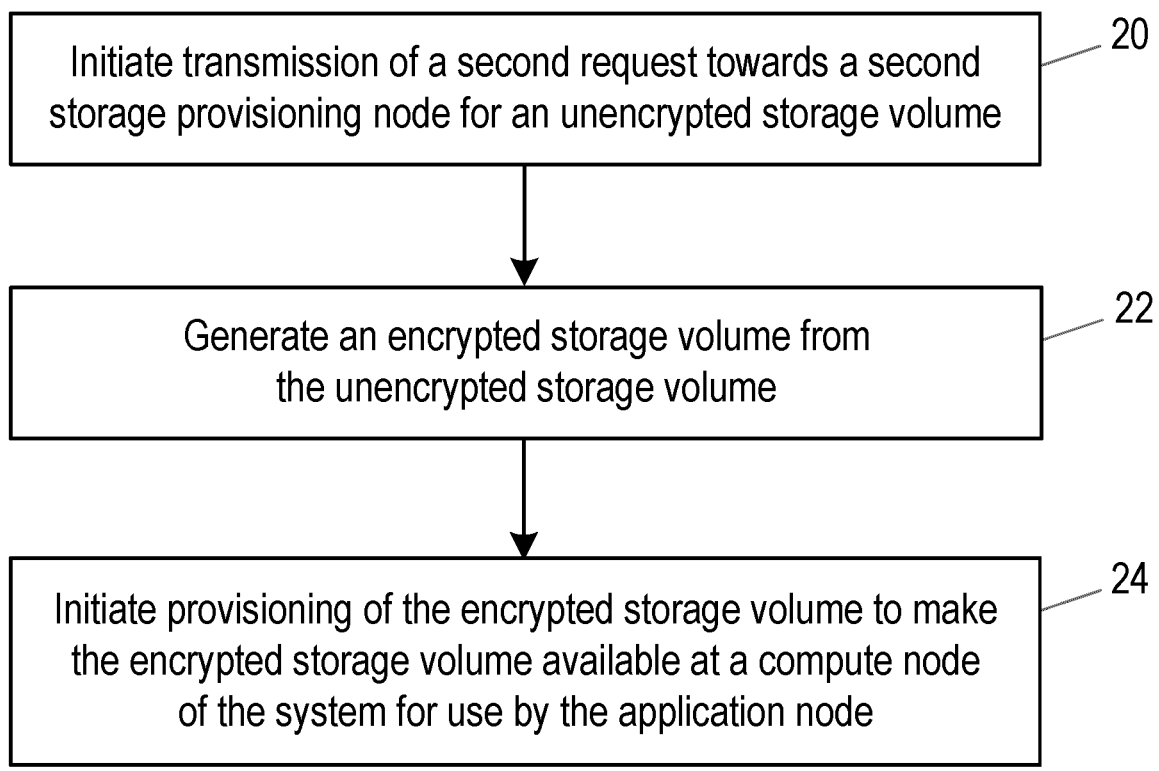
FIG. 6 is a block diagram illustrating a method performed by a first storage provisioning node according to an embodiment.

FIG. 6 is a flowchart illustrating a method performed by a first storage provisioning node 200 in accordance with an embodiment. The method is for provisioning storage in a system. The first storage provisioning node 200 described earlier with reference to FIG. 5 is configured to operate in accordance with the method of FIG. 6. The method can be performed by or under the control of the processing circuitry 202 of the first storage provisioning node 200.

As illustrated in FIG. 6, at block 20, in response to (e.g. the first storage provisioning node 200 receiving) a first request for an encrypted storage volume for an application node, transmission of a second request towards is initiated towards a second storage provisioning node for an unencrypted storage volume. More specifically, the processing circuitry 202 of the first storage provisioning node 200 initiates transmission of the second request (e.g. via a communications interface 206 of the first storage provisioning node 200). Thus, the first storage provisioning node 200 translates a first request for an encrypted storage volume into a second request for an unencrypted storage volume. Herein, the term "initiate" can mean, for example, cause or establish. Thus, the processing circuitry 202 of the first storage provisioning node 200 can be configured to itself transmit the second request or can be configured to cause another node to transmit the second request. In some embodiments, the transmission of the second request towards the second storage provisioning node may be via an orchestrator of the system.

In some embodiments, the first request referred to herein may be from the orchestrator of the system. In some embodiments, the first request referred to herein may originate from an application management node of the system. For example, in some embodiments, the first request referred to herein may be from an application management node of the system via an orchestrator of the system. In some embodiments, the first request referred to herein may be issued at deployment of the application node. For example, the first request referred to herein may be issued by the application management node of the system when it deploys the application node. The processing circuitry 202 of the first storage provisioning node 200 may be configured to receive the first request, e.g. via a communications interface 206 of the first storage provisioning node 200.

Returning back to FIG. 6, at block 22, in response to the requested unencrypted storage volume becoming available to the first storage provisioning node 200, an encrypted storage volume is generated from the unencrypted storage volume. Thus, the first storage provisioning node 200 can consume the unencrypted storage volume obtained by the second storage provisioning node and create an encrypted storage volume from it.

In some embodiments, the encrypted storage volume may be generated by applying an encrypted layer to the unencrypted storage volume. More specifically, in some embodiments, the processing circuitry 202 of the first storage provisioning node 200 can be configured to apply the encrypted layer to the unencrypted storage volume. In some embodiments, the application of the encrypted layer may be chosen when the unencrypted storage volume is provided with an unencrypted file system. In some embodiments, the encrypted layer may be an encrypted file system layer. For example, an encrypted file system may be deployed as a layer on top of the unencrypted storage volume. In some embodiments, an encrypted file system layer may be chosen when the unencrypted storage volume is an unencrypted raw block storage (i.e. when only an unencrypted storage device is provided, without a file system). This can provide performance benefits. The unencrypted storage volume may itself be an unencrypted file system. In some embodiments, the encrypted layer may be provided by the first storage provisioning node 200. In other embodiments, another node may provide the encrypted layer. In some embodiments where a container on which to make the unencrypted storage volume available at the compute node is generated, the generated container may provide the encrypted layer.

In an example approach for generating the encrypted storage volume, the processing circuitry 202 of the first storage provisioning node 200 may generate a file and use a device mapper functionality (e.g. where a file from the unencrypted storage volume is exposed as an encrypted storage device, which is formatted with another file system) to create an encrypted storage device as the encrypted storage volume referred to herein. In some embodiments, the processing circuitry 202 of the first storage provisioning node 200 may first format the device with a filesystem and then use this filesystem as the encrypted storage volume referred to herein. In another example approach for generating the encrypted storage volume, the processing circuitry 202 of the first storage provisioning node 200 may format a (raw) block storage device with a filesystem that supports encryption and use this filesystem as the encrypted storage volume referred to herein.

Returning back to FIG. 6, at block 24, provisioning of the encrypted storage volume is initiated to make the encrypted storage volume available at a compute node of the system for use by the application node or, more specifically, a storage consumer (e.g. a user, an application, or any other storage consumer) of the application node. More specifically, in some embodiments, the processing circuitry 202 of the first storage provisioning node 200 initiates the provisioning of the encrypted storage volume. For example, the processing circuitry 202 of the first storage provisioning node 200 may be configured to instruct (e.g. an operating system of) the compute node to make the encrypted storage volume available for use by the application node. In some embodiments, the processing circuitry 202 of the first storage provisioning node 200 may be configured to initiate transmission of (e.g. itself transmit or cause another node to transmit) the instruction towards (e.g. an operating system of) the compute node. The instruction may be for the compute node to publish the encrypted storage volume for use by the application node.

In some embodiments, initiating provisioning of the encrypted storage volume at block 24 of FIG. 6 to make the encrypted storage volume available at a compute node of the system for use by the application node may comprise initiating mounting of the encrypted storage volume to the compute node to make the encrypted storage volume available at the compute node for use by the application node. In some of these embodiments, initiating mounting of the encrypted storage volume to the compute node may comprise initiating mounting of the encrypted storage volume to a directory tree of the compute node. A person skilled in the art will appreciate that mounting of the encrypted storage volume to the compute node is only one example of the manner in which the encrypted storage volume can be made available at the compute node for use by the application node and that other examples are also possible. For example, in some embodiments, the encrypted storage volume can be made available at the compute node for use by the application node through other interfaces, such as a hypertext transfer protocol (HTTP) interface. This can be particularly useful for object storage.

In some embodiments, initiating provisioning of the encrypted storage volume at block 24 of FIG. 6 to make the encrypted storage volume available at the compute node for use by the application node may comprise initiating provisioning of the encrypted storage volume on the first storage provisioning node to make the encrypted storage volume available at the compute node. In some embodiments, initiating provisioning of the encrypted storage volume at block 24 of FIG. 6 to make the encrypted storage volume available at the compute node for use by the application node may comprise allocating a path within a directory tree of a host file system that is accessible to the application node.

Although not illustrated in FIG. 6, in some embodiments, the method may comprise initiating transmission of a third request towards the second storage provisioning node to cease making the unencrypted storage volume available at the compute node. More specifically, the processing circuitry 202 of the first storage provisioning node 200 may initiate transmission of the second request (e.g. via a communications interface 206 of the first storage provisioning node 200). As mentioned earlier, herein, the term "initiate" can mean, for example, cause or establish. Thus, the processing circuitry 202 of the first storage provisioning node 200 can be configured to itself transmit the third request or can be configured to cause another node to transmit the third request.

Although also not illustrated in FIG. 6, in some embodiments, the method may comprise, in response to (e.g. the first storage provisioning node 200 receiving) a fourth request to cease making the encrypted storage volume available at the compute node, initiating the ceasing of making the encrypted storage volume available at the compute node. More specifically, in some embodiments, the processing circuitry 202 of the first storage provisioning node 200 may initiate the ceasing of making the encrypted storage volume available at the compute node. For example, the processing circuitry 202 of the first storage provisioning node 200 may be configured to instruct (e.g. an operating system of) the compute node to cease make the encrypted storage volume available for use by the application node or, more specifically, the storage consumer (e.g. a user, an application, or any other storage consumer) of the application node. In some embodiments, the processing circuitry 202 of the first storage provisioning node 200 may be configured to initiate transmission of (e.g. itself transmit or cause another node to transmit) the instruction towards (e.g. an operating system of) the compute node.

Although also not illustrated in FIG. 6, in some embodiments, the method may comprise removing a configuration related to the encrypted storage volume from the compute node 300 in response to termination of the application node that uses (e.g. consumes) the encrypted storage volume. More specifically, in some embodiments, the processing circuitry 202 of the first storage provisioning node 200 can be configured to remove this configuration. In some containerised embodiments, a sidecar container may be added to remove any configuration related to the encrypted storage volume from the compute node 300. The sidecar container may run in privileged mode. In this way, the first storage provisioning node 200 can clean up, e.g. by making sure that there is no configuration residue or orphaned objects left behind.

Figure 7:
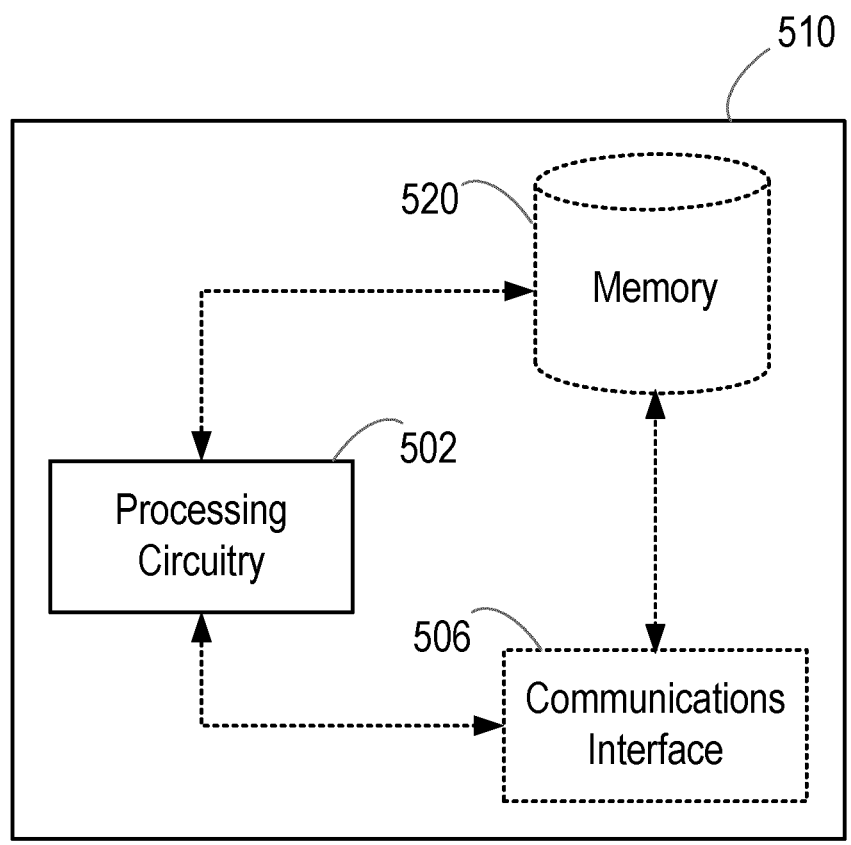
FIG. 7 is a block diagram illustrating a second storage provisioning node according to an embodiment.

FIG. 7 illustrates a second storage provisioning node 510 of a system in accordance with an embodiment. The second storage provisioning node 510 is for provisioning storage in the system. The second storage provisioning node 510 may, for example, be a physical machine (e.g. a server) or a virtual machine (VM). The second storage provisioning node 510 can be a storage provisioning node of a data center according to some embodiments. The second storage provisioning node 510 can be responsible for allocating storage in the system.

As illustrated in FIG. 7, the second storage provisioning node 510 comprises processing circuitry (or logic) 502. The processing circuitry 502 controls the operation of the second storage provisioning node 510 and can implement the method described herein in respect of the second storage provisioning node 510. The processing circuitry 502 can be configured or programmed to control the second storage provisioning node 510 in the manner described herein. The processing circuitry 502 can comprise one or more hardware components, such as one or more processors, one or more processing units, one or more multi-core processors, and/or one or more modules. In particular implementations, each of the one or more hardware components can be configured to perform, or is for performing, individual or multiple steps of the method described herein in respect of the second storage provisioning node 510. In some embodiments, the processing circuitry 502 can be configured to run software to perform the method described herein in respect of the second storage provisioning node 510. The software may be containerised according to some embodiments. Thus, in some embodiments, the processing circuitry 502 may be configured to run a container to perform the method described herein in respect of the second storage provisioning node 510.

Briefly, the processing circuitry 502 of the second storage provisioning node 510 is configured to, in response to a second request from a first storage provisioning node 200 of the system for an unencrypted storage volume, initiate provisioning of the unencrypted storage volume to make the unencrypted storage volume available at a compute node of the system to the first storage provisioning node 200 for the first storage provisioning node to use in the generation of an encrypted storage volume to be made available at the compute node for use by an application node.

As illustrated in FIG. 7, in some embodiments, the second storage provisioning node 510 may optionally comprise a memory 520. The memory 520 of the second storage provisioning node 510 can comprise a volatile memory or a non-volatile memory. In some embodiments, the memory 520 of the second storage provisioning node 510 may comprise a non-transitory media. Examples of the memory 520 of the second storage provisioning node 510 include, but are not limited to, a random access memory (RAM), a read only memory (ROM), a mass storage media such as a hard disk, a removable storage media such as a compact disk (CD) or a digital video disk (DVD), and/or any other memory. In some embodiments, the memory 520 of the second storage provisioning node 510 may comprise one or more storage devices, e.g. a pool of storage devices.

The processing circuitry 502 of the second storage provisioning node 510 can be connected to the memory 520 of the second storage provisioning node 510. In some embodiments, the memory 520 of the second storage provisioning node 510 may be for storing program code or instructions which, when executed by the processing circuitry 502 of the second storage provisioning node 510, cause the second storage provisioning node 510 to operate in the manner described herein in respect of the second storage provisioning node 510. For example, in some embodiments, the memory 520 of the second storage provisioning node 510 may be configured to store program code or instructions that can be executed by the processing circuitry 502 of the second storage provisioning node 510 to cause the second storage provisioning node 510 to operate in accordance with the method described herein in respect of the second storage provisioning node 510. Alternatively or in addition, the memory 520 of the second storage provisioning node 510 can be configured to store any information, data, messages, requests, responses, indications, notifications, signals, or similar, that are described herein. The processing circuitry 502 of the second storage provisioning node 510 may be configured to control the memory 520 of the second storage provisioning node 510 to store information, data, messages, requests, responses, indications, notifications, signals, or similar, that are described herein.

In some embodiments, as illustrated in FIG. 7, the second storage provisioning node 510 may optionally comprise a communications interface 506. The communications interface 506 of the second storage provisioning node 510 can be connected to the processing circuitry 502 of the second storage provisioning node 510 and/or the memory 520 of second storage provisioning node 510. The communications interface 506 of the second storage provisioning node 510 may be operable to allow the processing circuitry 502 of the second storage provisioning node 510 to communicate with the memory 520 of the second storage provisioning node 510 and/or vice versa. Similarly, the communications interface 506 of the second storage provisioning node 510 may be operable to allow the processing circuitry 502 of the second storage provisioning node 510 to communicate with the first storage provisioning node, compute node and/or any other node. The communications interface 506 of the second storage provisioning node 510 can be configured to transmit and/or receive information, data, messages, requests, responses, indications, notifications, signals, or similar, that are described herein. In some embodiments, the processing circuitry 502 of the second storage provisioning node 510 may be configured to control the communications interface 506 of the second storage provisioning node 510 to transmit and/or receive information, data, messages, requests, responses, indications, notifications, signals, or similar, that are described herein.

Although the second storage provisioning node 510 is illustrated in FIG. 7 as comprising a single memory 520, it will be appreciated that the second storage provisioning node 510 may comprise at least one memory (i.e. a single memory or a plurality of memories) 520 that operate in the manner described herein. Similarly, although the second storage provisioning node 510 is illustrated in FIG. 7 as comprising a single communications interface 506, it will be appreciated that the second storage provisioning node 510 may comprise at least one communications interface (i.e. a single communications interface or a plurality of communications interface) 506 that operate in the manner described herein.

It will also be appreciated that FIG. 7 only shows the components required to illustrate an embodiment of the second storage provisioning node 510 and, in practical implementations, the second storage provisioning node 510 may comprise additional or alternative components to those shown.

In some embodiments, the hardware (e.g. processing circuitry 502, memory 520, and/or communications interface 506) that can implement the method described herein in respect of the second storage provisioning node 510 may be the same hardware as that which implements the method performed by a compute node (e.g. of a cluster of compute nodes), such as the compute node described herein. For example, in some embodiments, the second storage provisioning node 510 may be software that the hardware (e.g. processing circuitry) of the compute node can run to implement the method described herein in respect of the second storage provisioning node 510. In other embodiments, the hardware (e.g. processing circuitry 502, memory 520, and/or communications interface 506) that can implement the method described herein in respect of the second storage provisioning node 510 may be the hardware of a storage backend node that comprises the second storage provisioning node 510. For example, in some embodiments, the second storage provisioning node 510 may be software that the hardware (e.g. processing circuitry) of the storage backend node can run to implement the method described herein in respect of the second storage provisioning node 510.

FIG. 8 is a flowchart illustrating a method performed by a second storage provisioning node 510 in accordance with an embodiment. The method is for provisioning storage in a system. The second storage provisioning node 510 described earlier with reference to FIG. 7 is configured to operate in accordance with the method of FIG. 8. The method can be performed by or under the control of the processing circuitry 502 of the second storage provisioning node 510.

As illustrated in FIG. 8, at block 50, in response to (e.g. the second storage provisioning node 510 receiving) a second request from a first storage provisioning node 200 of the system for an unencrypted storage volume, provisioning of the unencrypted storage volume is initiated to make the unencrypted storage volume available at a compute node of the system to the first storage provisioning node 200. The unencrypted storage volume is made available to the first storage provisioning node 200 for the first storage provisioning node 200 to use in the generation of an encrypted storage volume. This encrypted storage volume is to be made available at the compute node for use by an application node or, more specifically, a storage consumer (e.g. a user, an application, or any other storage consumer) of the application node.

More specifically, the processing circuitry 502 of the second storage provisioning node 510 initiates the provisioning of the unencrypted storage volume. For example, the processing circuitry 502 of the second storage provisioning node 510 may be configured to instruct (e.g. an operating system of) the compute node to make the unencrypted storage volume available to the first storage provisioning node 200. In some embodiments, the processing circuitry 502 of the second storage provisioning node 510 may be configured to initiate transmission of (e.g. itself transmit or cause another node to transmit) the instruction towards (e.g. an operating system of) the compute node. The instruction may be for the compute node to publish the unencrypted storage volume system to the first storage provisioning node 200.

In some embodiments, initiating provisioning of the unencrypted storage volume at block 50 of FIG. 8 to make the unencrypted storage volume available at the compute node to the first storage provisioning node 200 may comprise initiating mounting of the unencrypted storage volume to the compute node to make the unencrypted storage volume available to the first storage provisioning node 200. In some embodiments, initiating provisioning of the unencrypted storage volume at block 50 of FIG. 8 to make the unencrypted storage volume available at the compute node to the first storage provisioning node 200 may comprise initiating generating of a container on which to make the unencrypted storage volume available at the compute node.

A person skilled in the art will appreciate that mounting of the unencrypted storage volume to the compute node and generating of a container are only some examples of the manner in which the unencrypted storage volume can be made available at the compute node to the first storage provisioning node 200 and that other examples are also possible. For example, in some embodiments, the unencrypted storage volume can be made available at the compute node to the first storage provisioning node 200 through other interfaces, such as a hypertext transfer protocol (HTTP) interface. This can be particularly useful for object storage.

Although not illustrated in FIG. 8, in some embodiments, the method may comprise, in response to (e.g. the second storage provisioning node 510 receiving) a third request from the first storage provisioning node to cease making the unencrypted storage volume available at the compute node, initiate the ceasing of making the unencrypted storage volume available at the compute node. More specifically, in some embodiments, the processing circuitry 502 of the second storage provisioning node 510 can be configured to initiate the ceasing of making the unencrypted storage volume available at the compute node. For example, the processing circuitry 502 of the second storage provisioning node 510 may be configured to instruct (e.g. an operating system of) the compute node to cease making the encrypted storage volume available. In some embodiments, the processing circuitry 502 of the second storage provisioning node 510 may be configured to initiate transmission of (e.g. itself transmit or cause another node to transmit) the instruction towards (e.g. an operating system of) the compute node. In some of these embodiments, initiating the ceasing of making the unencrypted storage volume available at the compute node may comprise initiating unmounting of the unencrypted storage volume from the compute node.

In some embodiments, the compute node may be separate to the second storage provisioning node 510. For example, the second storage provisioning node 510 (or, in some embodiments, the storage backend 500 that comprises the second storage provisioning node 510) may be an entity that is separate to the compute node described herein, with its own dedicated software and/or hardware. In other embodiments, the compute node may comprise the second storage provisioning node 510. For example, in some embodiments, the method described herein in respect of the second storage provisioning node 510 may be running as (e.g. containerised) software on the compute node described herein. In some embodiments, the compute node described herein may at the same time be running (e.g. containerised) application software. This may be referred to as "hyperconverged software defined storage". Alternatively, in some embodiments, the compute node described herein may be exclusively used for storage. This may be referred to as "software defined storage". In some embodiments involving a cluster, the method described herein in respect of the second storage provisioning node 510 may be running as (e.g. containerised) software on one or more (or each) of the plurality of compute nodes.

Although not illustrated in FIG. 8, in some embodiments, the method may comprise initiating unprovisioning of the unencrypted storage volume to cease making the unencrypted storage volume available at the compute node. More specifically, the processing circuitry 502 of the second storage provisioning node 510 may be configured to initiate the unprovisioning of the unencrypted storage volume. For example, the processing circuitry 502 of the second storage provisioning node 510 may be configured to instruct (e.g. an operating system of) the compute node to cease making the unencrypted storage volume available. In some embodiments, the processing circuitry 502 of the second storage provisioning node 510 may be configured to initiate transmission of (e.g. itself transmit or cause another node to transmit) the instruction towards (e.g. an operating system of) the compute node.

Figure 9:
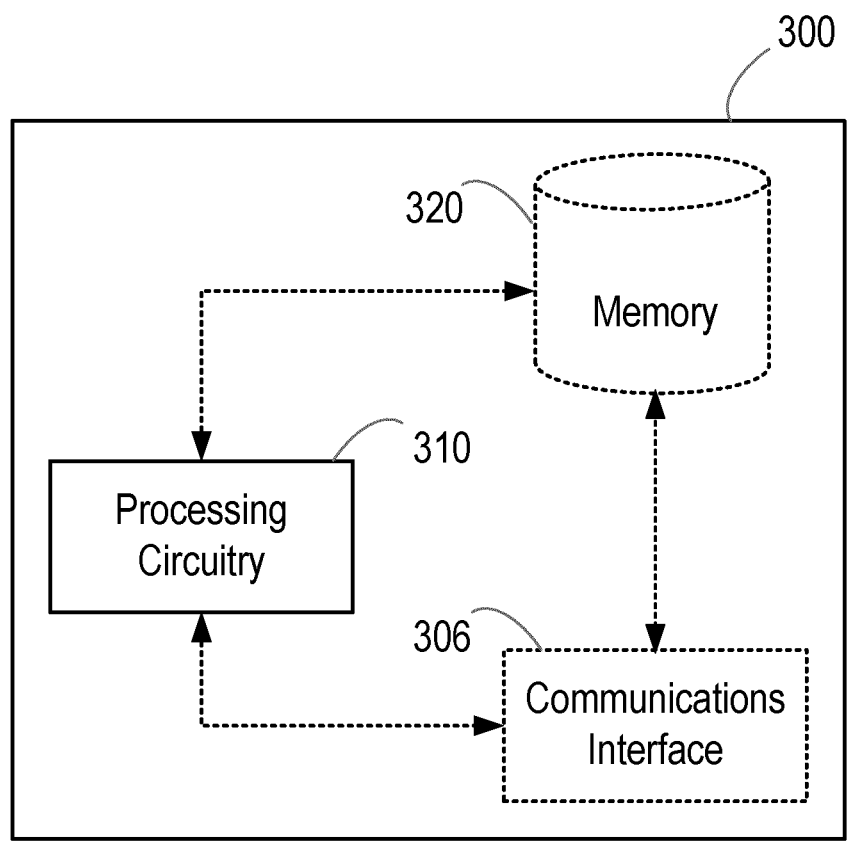
FIG. 9 is a block diagram illustrating a compute node according to an embodiment.

FIG. 9 illustrates a compute node 300 of a system in accordance with an embodiment. The compute node 300 is for provisioning storage in the system. The compute node 300 may also be referred to herein as a compute host. The compute node 300 may, for example, be a physical machine (e.g. a server) or a virtual machine (VM). In some embodiments, the compute node 300 can be configured to run (e.g. the software for) the application node referred to herein.

As illustrated in FIG. 9, the compute node 300 comprises processing circuitry (or logic) 310. The processing circuitry 310 controls the operation of the compute node 300 and can implement the method described herein in respect of the compute node 300. The processing circuitry 310 can be configured or programmed to control the compute node 300 in the manner described herein. The processing circuitry 310 can comprise one or more hardware components, such as one or more processors, one or more processing units, one or more multi-core processors, and/or one or more modules. In particular implementations, each of the one or more hardware components can be configured to perform, or is for performing, individual or multiple steps of the method described herein in respect of the compute node 300. In some embodiments, the processing circuitry 310 can be configured to run software to perform the method described herein in respect of the compute node 300. The software may be containerised according to some embodiments. Thus, in some embodiments, the processing circuitry 310 may be configured to run a container to perform the method described herein in respect of the compute node 300.

Briefly, the processing circuitry 310 of the compute node 300 is configured to provision an unencrypted storage volume requested by a first storage provisioning node to make the unencrypted storage volume available at the compute node to the first storage provisioning node 200 for the first storage provisioning node 200 to use in the generation of an encrypted storage volume. The processing circuitry 310 of the compute node 300 is also configured to provision the encrypted storage volume generated by the first storage provisioning node to make the encrypted storage volume available at the compute node for use by an application node.

As illustrated in FIG. 9, in some embodiments, the compute node 300 may optionally comprise a memory 320. The memory 320 of the compute node 300 can comprise a volatile memory or a non-volatile memory. In some embodiments, the memory 320 of the compute node 300 may comprise a non-transitory media. Examples of the memory 320 of the compute node 300 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 310 of the compute node 300 can be connected to the memory 320 of the compute node 300. In some embodiments, the memory 320 of the compute node 300 may be for storing program code or instructions which, when executed by the processing circuitry 310 of the compute node 300, cause the compute node 300 to operate in the manner described herein in respect of the compute node 300. For example, in some embodiments, the memory 320 of the compute node 300 may be configured to store program code or instructions that can be executed by the processing circuitry 310 of the compute node 300 to cause the compute node 300 to operate in accordance with the method described herein in respect of the compute node 300. Alternatively or in addition, the memory 320 of the compute node 300 can be configured to store any information, data, messages, requests, responses, indications, notifications, signals, or similar, that are described herein. The processing circuitry 310 of the compute node 300 may be configured to control the memory 320 of the compute node 300 to store information, data, messages, requests, responses, indications, notifications, signals, or similar, that are described herein.

In some embodiments, as illustrated in FIG. 9, the compute node 300 may optionally comprise a communications interface 306, e.g. a network interface and/or a storage interface. The communications interface 306 of the compute node 300 can be connected to the processing circuitry 310 of the compute node 300 and/or the memory 320 of compute node 300. The communications interface 306 of the compute node 300 may be operable to allow the processing circuitry 310 of the compute node 300 to communicate with the memory 320 of the compute node 300 and/or vice versa. Similarly, the communications interface 306 of the compute node 300 may be operable to allow the processing circuitry 310 of the compute node 300 to communicate with the first storage provisioning node, second storage provisioning node and/or any other node. The communications interface 306 of the compute node 300 can be configured to transmit and/or receive information, data, messages, requests, responses, indications, notifications, signals, or similar, that are described herein. In some embodiments, the processing circuitry 310 of the compute node 300 may be configured to control the communications interface 306 of the compute node 300 to transmit and/or receive information, data, messages, requests, responses, indications, notifications, signals, or similar, that are described herein.

Although the compute node 300 is illustrated in FIG. 9 as comprising a single memory 320, it will be appreciated that the compute node 300 may comprise at least one memory (i.e. a single memory or a plurality of memories) 320 that operate in the manner described herein. Similarly, although the compute node 300 is illustrated in FIG. 9 as comprising a single communications interface 306, it will be appreciated that the compute node 300 may comprise at least one communications interface (i.e. a single communications interface or a plurality of communications interface) 306 that operate in the manner described herein.

It will also be appreciated that FIG. 9 only shows the components required to illustrate an embodiment of the compute node 300 and, in practical implementations, the compute node 300 may comprise additional or alternative components to those shown.

As mentioned earlier, in some embodiments, the hardware (e.g. processing circuitry 310, memory 320, and/or communications interface 306) that can implement the method described herein in respect of the compute node 300 may also be used to implement the method described herein in respect of the first storage provisioning node 200 and/or the method described herein in respect of the application node. As also mentioned earlier, in some embodiments, the hardware (e.g. processing circuitry 310, memory 320, and/or communications interface 306) that can implement the method described herein in respect of the compute node 300 may also be used to implement the method performed by the second storage provisioning node 510.

Figure 10:
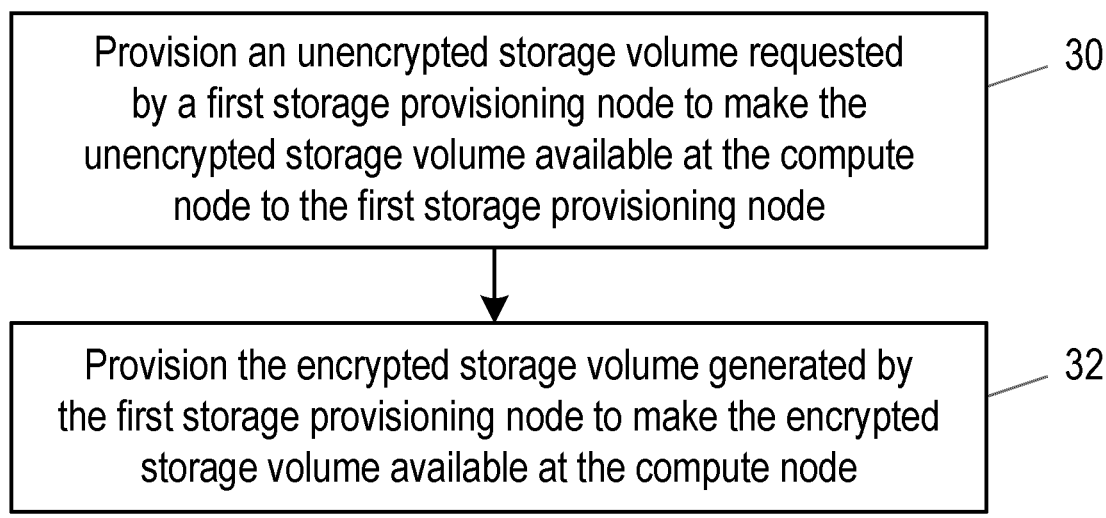
FIG. 10 is a block diagram illustrating a method performed by a compute node according to an embodiment.

FIG. 10 is a flowchart illustrating a method performed by a compute node 300 in accordance with an embodiment. The method is for provisioning storage in a system. The compute node 300 described earlier with reference to FIG. 9 is configured to operate in accordance with the method of FIG. 10. The method can be performed by or under the control of the processing circuitry 310 of the compute node 300.

As illustrated in FIG. 10, at block 30, an unencrypted storage volume requested by a first storage provisioning node 200 is provisioned to make the unencrypted storage volume available at the compute node 300 to the first storage provisioning node 200 for the first storage provisioning node 200 to use in the generation of an encrypted storage volume. More specifically, the processing circuitry 310 of the compute node 300 provisions the requested unencrypted storage volume.

In some embodiments, provisioning the unencrypted storage volume at block 30 of FIG. 10 to make the unencrypted storage volume available at the compute node 300 may comprise generating a container on which to make the unencrypted storage volume available at the compute node 300. In some embodiments, provisioning the unencrypted storage volume at block 30 of FIG. 10 to make the unencrypted storage volume available at the compute node 300 to the first storage provisioning node 200 may comprise mounting the unencrypted storage volume to the compute node 300 to make the unencrypted storage volume available to the first storage provisioning node 200. In some embodiments, mounting the unencrypted storage volume to the compute node may comprise mounting the unencrypted storage volume to a directory tree of the compute node. In some embodiments where a container is generated, mounting the unencrypted storage volume to the compute node may comprise mounting the unencrypted storage volume to the generated container. Thus, in some embodiments, a newly generated (e.g. an additional) container may serve as a mount target for the unencrypted storage volume.

As mentioned earlier, a person skilled in the art will appreciate that generating a container and mounting of the unencrypted storage volume to the compute node are only some examples of the manner in which the unencrypted storage volume can be made available at the compute node to the first storage provisioning node 200 and that other examples are also possible. For example, in some embodiments, the unencrypted storage volume can be made available at the compute node to the first storage provisioning node 200 through other interfaces, such as a hypertext transfer protocol (HTTP) interface. This can be particularly useful for object storage.

Returning back to FIG. 10, at block 32, the encrypted storage volume generated by the first storage provisioning node 200 is provisioned to make the encrypted storage volume available at the compute node for use by an application node or, more specifically, a storage consumer (e.g. a user, an application, or any other storage consumer) of the application node. More specifically, the processing circuitry 310 of the compute node 300 provisions the encrypted storage volume.

In some embodiments, provisioning the encrypted storage volume at block 32 of FIG. 10 to make the encrypted storage volume available at the compute node 300 may comprise provisioning the encrypted storage volume on the first storage provisioning node 200 to make the encrypted storage volume available at the compute node 300. In some embodiments, provisioning the encrypted storage volume at block 32 of FIG. 10 to make the encrypted storage volume available at the compute node 300 for use by the application node may comprise mounting the encrypted storage volume to the compute node 300 to make the encrypted storage volume available at the compute node 300 for use by the application node. In some embodiments, mounting the encrypted storage volume to the compute node 300 may comprise mounting the encrypted storage volume to the directory tree of the compute node.

A person skilled in the art will appreciate that mounting of the encrypted storage volume to the compute node is only one example of the manner in which the encrypted storage volume can be made available at the compute node for use by the application node and that other examples are also possible. For example, in some embodiments, the encrypted storage volume can be made available at the compute node for use by the application node through other interfaces, such as a hypertext transfer protocol (HTTP) interface. This can be particularly useful for object storage.

In some embodiments, provisioning the encrypted storage volume at block 32 of FIG. 10 to make the encrypted storage volume available at the compute node 300 may comprise allocating a path within a directory tree of a host file system that is accessible to the application node.

Although not illustrated in FIG. 10, in some embodiments, the method may comprise ceasing to make the encrypted storage volume available at the compute node 300 and/or ceasing to make the unencrypted storage volume available at the compute node 300. In some embodiments, ceasing to make the encrypted storage volume available at the compute node 300 may comprise unmounting the encrypted storage volume from the compute node 300. In some embodiments, ceasing to make the unencrypted storage volume available at the compute node 300 may comprise unmounting the unencrypted storage volume from the compute node 300. More specifically, in some embodiments, the processing circuitry 310 of the compute node 300 can be configured to unmount the encrypted storage volume and/or the unencrypted storage volume from the compute node 300. In some embodiments, ceasing to make the encrypted storage volume available at the compute node 300 and/or ceasing to make the unencrypted storage volume available at the compute node 300 may be in response to a trigger. In some embodiments, the trigger may be from an orchestrator (e.g. a Kubernetes or any other orchestrator) of the system.

In some embodiments involving unmounting the encrypted storage volume from the compute node 300, the unmounted encrypted storage volume may be remounted to another compute node. This other compute node may be configured in the same way as the compute node 300 described herein. The other compute node and the compute node 300 described herein may be part of the same cluster. The remounting of the encrypted storage volume may apply when a container is evicted from the compute node 300 described herein and re-scheduled to the other compute node. In these embodiments, the encrypted storage volume (including all data stored on it) can be kept. The encrypted storage volume may be (implicitly or explicitly) removed from the compute node 300 and recreated on the other compute node by the first storage provisioning node 200.

In some embodiments, as described earlier, the compute node 300 may be separate to the second storage provisioning node 510 of the system described herein. In some embodiments, as described earlier, the compute node 300 may comprise the second storage provisioning node 510 of the system described herein.

There is also provided a system comprising one or more first storage provisioning nodes 200 as described herein, one or more second storage provisioning nodes 510 as described herein, and/or one or more compute nodes 300 as described herein. In the system, the first storage provisioning node 200 described herein can be placed (e.g. positioned or located) between the second storage provisioning node 510 described herein and the application node referred to herein. As mentioned earlier, the first storage provisioning node 200 described herein acts as a shim.

Figure 11:
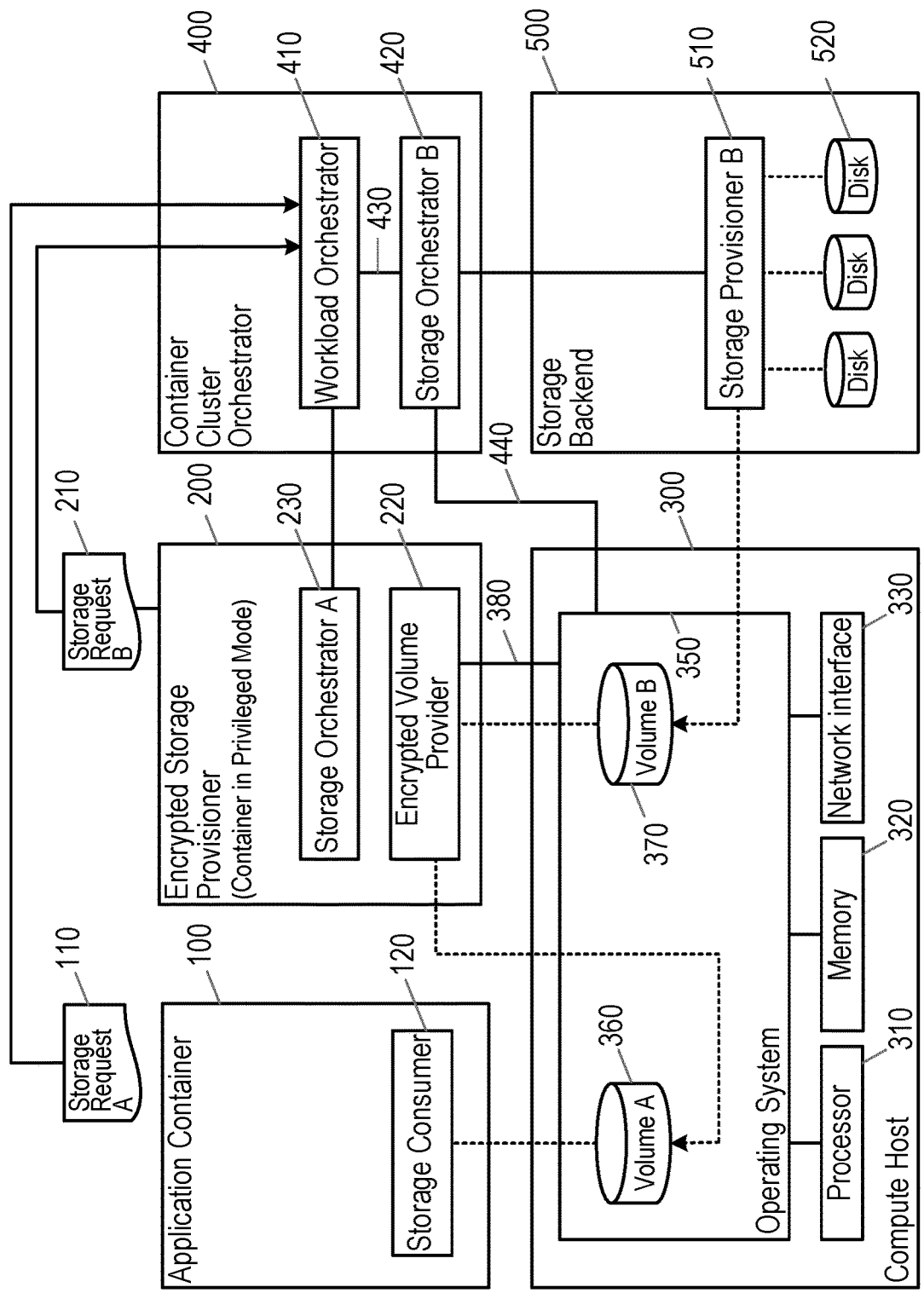
FIG. 11 is a block diagram illustrating a system according to an embodiment.
Figure 12:
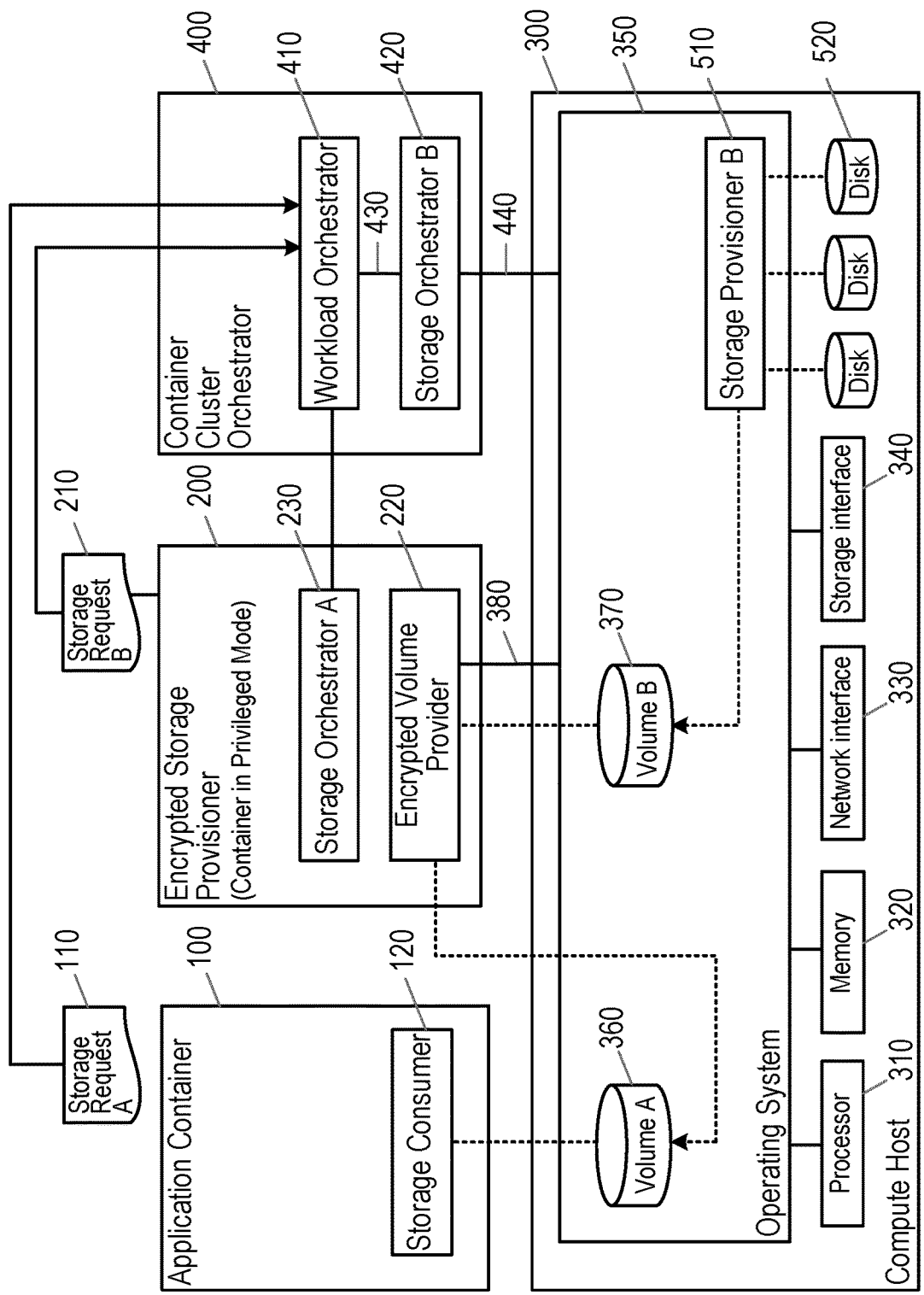
FIG. 12 is a block diagram illustrating a system according to an embodiment.

FIGS. 11 and 12 each illustrate such a system in accordance with an embodiment.

Figure 1:
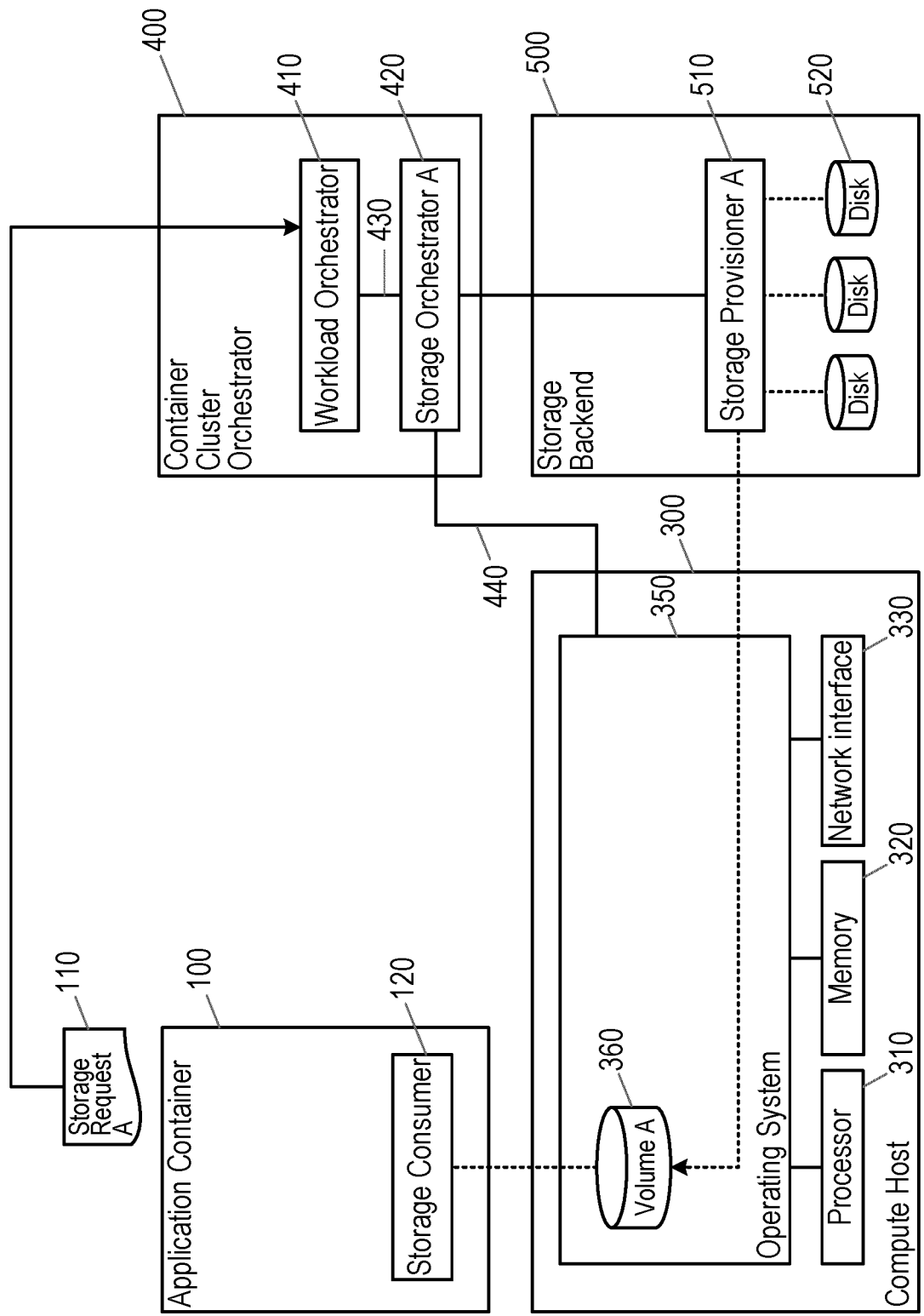
FIG. 1 is a block diagram illustrating an existing system.

The system illustrated in FIG. 11 is as described earlier with reference to FIG. 1 with the exception that the system illustrated in FIG. 11 also comprises a first storage provisioning node 200 configured in the manner described earlier with reference to FIGS. 5 and 6 in addition to the second storage provisioning node 510. Also, in the embodiment illustrated in FIG. 11, the second storage provisioning node 510 is configured in the manner described earlier with reference to FIGS. 7 and 8, and the compute node 300 is configured in the manner described earlier with reference to FIGS. 9 and 10.

Figure 2:
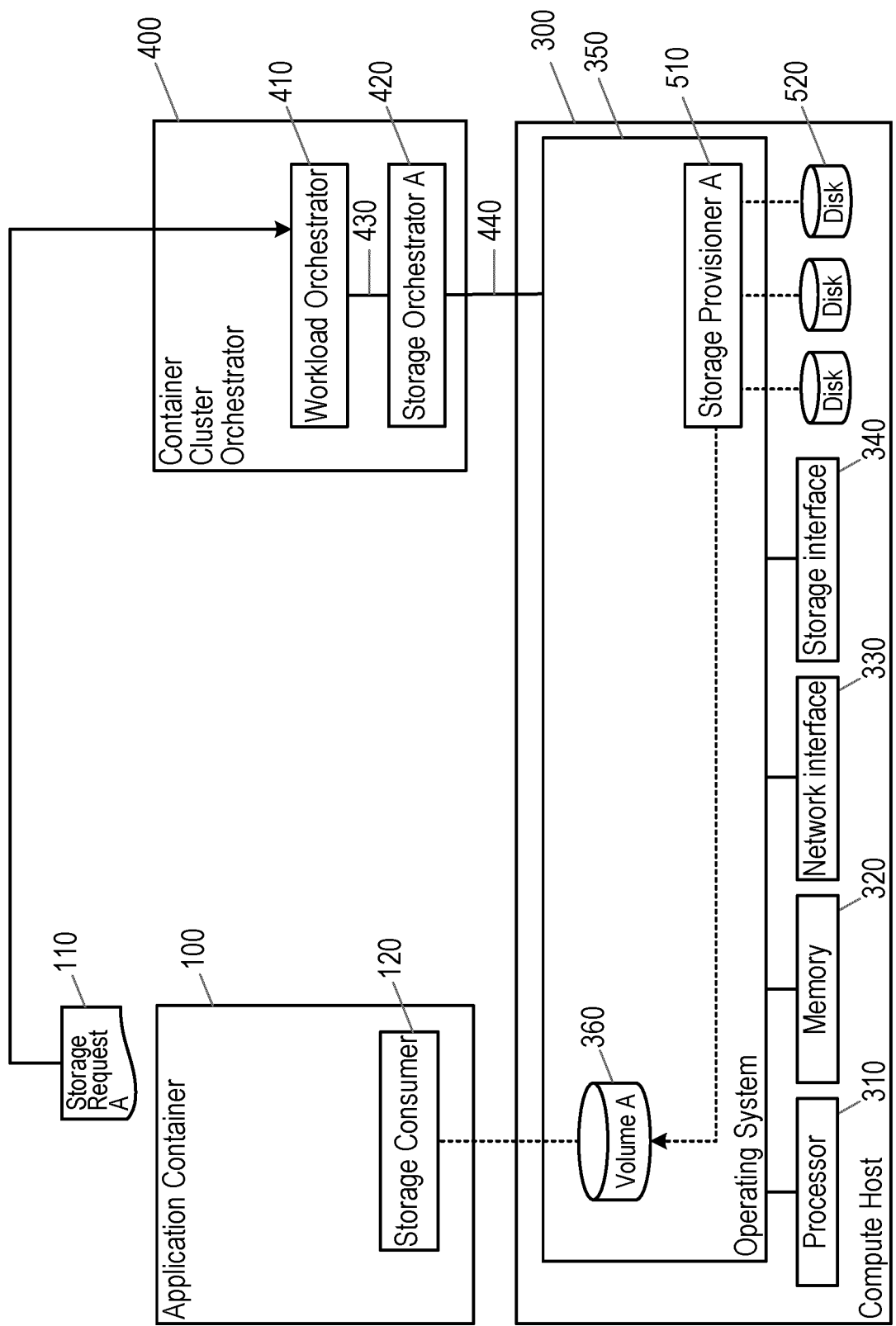
FIG. 2 is a block diagram illustrating an existing system.

The system illustrated in FIG. 12 is as described earlier with reference to FIG. 2 with the exception that the system illustrated in FIG. 12 also comprises a first storage provisioning node 200 configured in the manner described earlier with reference to FIGS. 5 and 6 in addition to the second storage provisioning node 510. Also, in the embodiment illustrated in FIG. 12, the second storage provisioning node 510 is configured in the manner described earlier with reference to FIGS. 7 and 8, and the compute node 300 is configured in the manner described earlier with reference to FIGS. 9 and 10.

In the system illustrated in FIG. 11, the storage backend 500 comprises the second storage provisioning node 510. Thus, storage is accessed over a network connection (e.g. software defined storage, network attached storage, etc.). In this embodiment, the second storage provisioning node 510 can comprise its own hardware as described earlier. On the other hand, in the system illustrated in FIG. 12, the compute node 300 comprises the second storage provisioning node 510. Thus, storage is directly attached to the compute node 300. In this embodiment, the hardware of the second storage provisioning node 510 may be the same hardware as the compute node 300 as described earlier.

In the systems illustrated in FIGS. 11 and 12, the first storage provisioning node 200 and the operating system 350 of the compute node 300 may communicate via an interface 380. In some embodiments, as illustrated in FIGS. 11 and 12, the processing circuitry of 202 of the first storage provisioning node 200 may comprise an encrypted volume provider module 220 for initiating provisioning of the encrypted storage volume 360 in the manner described herein. In some embodiments, as illustrated in FIGS. 11 and 12, the processing circuitry of 202 of the first storage provisioning node 200 may comprise a storage orchestrator 230. As illustrated in FIGS. 11 and 12, the application node 100 can comprise a storage consuming entity 120. The storage consuming entity 120 may be configured to use (or consume) the encrypted storage 360 according to some embodiments.

In the systems illustrated in FIGS. 11 and 12, the first storage provisioning node 200 acts as a storage consumer towards the second storage provisioning node 510. More specifically, the first storage provisioning node 200 acts as a storage consumer of the unencrypted storage volume 370 that is provided by the second storage provisioning node 510. In some embodiments where the processing circuitry of 202 of the first storage provisioning node 200 comprises an encrypted volume provider module 220, the encrypted volume provider module 220 of the first storage provisioning node 200 may act as the storage consumer of the unencrypted storage volume 370 that is provided by the second storage provisioning node 510. In the systems illustrated in FIGS. 11 and 12, the first storage provisioning node 200 can act as a storage orchestrator 230 towards the workload orchestrator 410.

Figure 13:
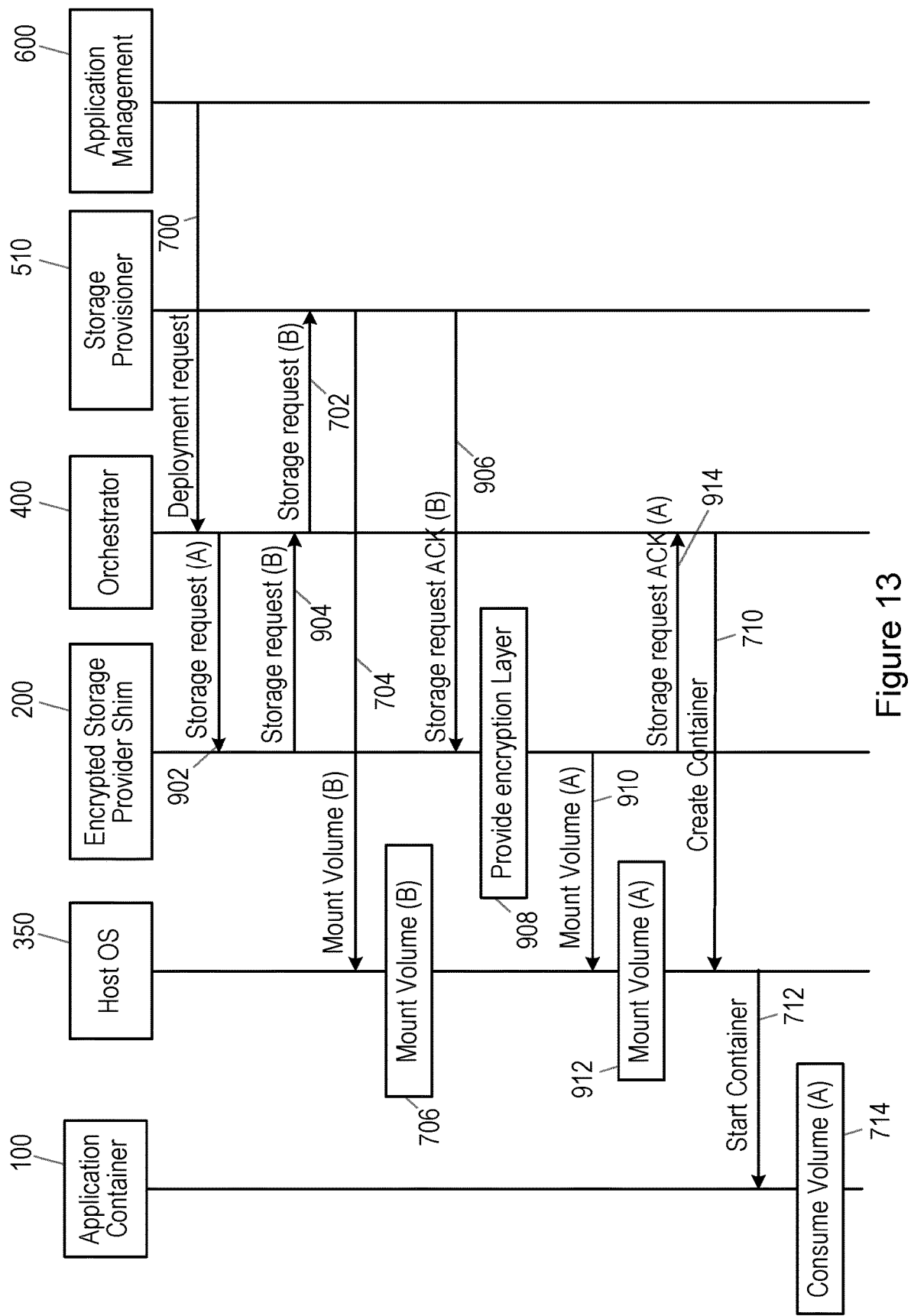
FIG. 13 is a signalling diagram illustrating an exchange of signals in a system according to an embodiment.

FIG. 13 is a signalling (or call flow) diagram illustrating an exchange of signals in a system according to an embodiment. The system may be as illustrated in FIG. 11 or 12 according to some embodiments. As illustrated in FIG. 13, the system comprises the application node 100, the operating system (OS) 350 of the compute node 300, the first storage provisioning node 200, the orchestrator 400, and the second storage provisioning node 510. The system illustrated in FIG. 13 also comprises an application management node 600. The application management node 600 may be implemented in hardware and/or software, which is not shown.

Figure 3:
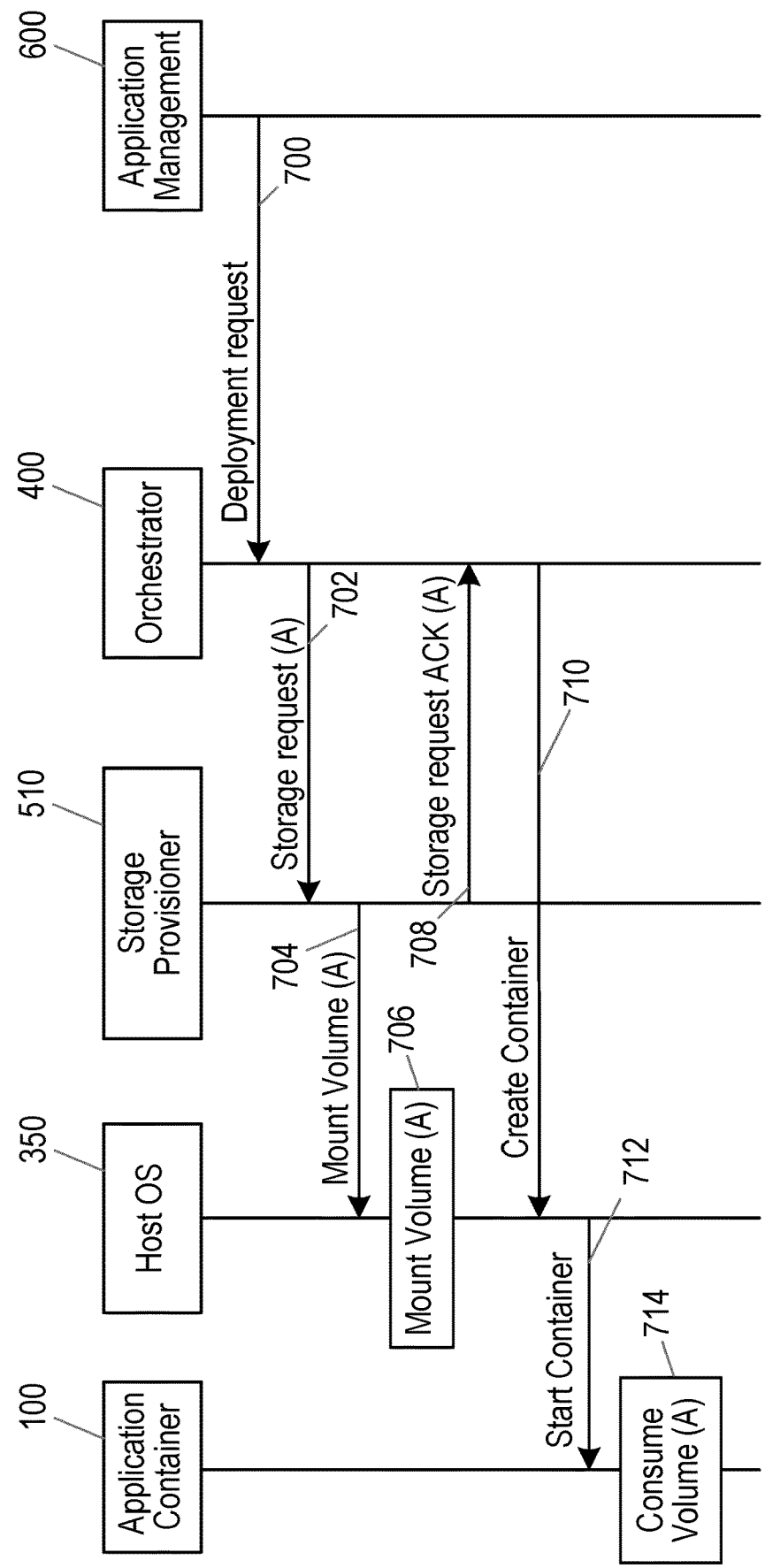
FIG. 3 is a signalling diagram illustrating an exchange of signals in an existing system.

In the embodiment of FIG. 13, as illustrated, the steps 700, 702, 704, 706, 710, 712 and 714 may be performed in the manner described earlier with reference to FIG. 3. The corresponding description of these steps with reference to FIG. 3 will thus be understood to also apply to FIG. 13, even if they are not repeated here. However, at step 706 of FIG. 13, the unencrypted storage volume 370 is made available at the compute node 100 to the first storage provisioning node 200 (rather than to the application node 100 as it is at step 706 of FIG. 3). Also, additional steps 902, 904, 906, 908, 910, 912 and 914 may also be performed according to the embodiment illustrated in FIG. 13.

In some embodiments, the deployment request (as illustrated by arrow 700 of FIG. 13) transmitted by the application management node 600 to the orchestrator 400 may comprise a manifest. The manifest may, for example, be delivered as part of an application product package. In some embodiments, the manifest may describe the storage needs of the application node 100. In some embodiments, the manifest may comprise the description of the storage needs of the application node 100 and also a (direct or indirect) pointer to the first storage provisioning node 200.

With reference to FIGS. 11, 12 and 13, in the embodiment of FIG. 13, the orchestrator 400 passes a first request 110 towards the first storage provisioning node 200 for an encrypted storage volume as illustrated by arrow 902 of FIG. 13. In some embodiments, the first request 110 referred to herein may be triggered by an application product package deployment operation. In some embodiments, the first request 110 referred to herein may be served as an input to the orchestrator 400, e.g. at time of application deployment. This can be performed either directly by an administrator interacting with the orchestrator 400, e.g. through a user interface, or by the application management node 600.

In response to the first request 110 for an encrypted storage volume (as illustrated by arrow 902 of FIG. 13), transmission of a second request 210 is initiated by the first storage provisioning node 200 towards the second storage provisioning node 510, e.g. via the orchestrator 400, as illustrated by arrows 904 and 702 of FIG. 13. For example, as illustrated by arrows 904 and 702 of FIG. 13, the first storage provisioning node 200 may itself transmit the second request 210 towards the second storage provisioning node 510, e.g. via the orchestrator 400. The second request 210 is a request for an unencrypted storage volume. Thus, the first storage provisioning node 200 translates the first request for an encrypted storage volume into a second request for an unencrypted storage volume.

As illustrated by arrow 704 of FIG. 13, in response to the second request 210 from the first storage provisioning node 200 (as illustrated by arrows 904 and 702 of FIG. 13), provisioning of the unencrypted storage volume 370 is initiated by the second storage provisioning node 510. The provisioning of the unencrypted storage volume 370 is initiated to make the unencrypted storage volume 370 available at (e.g. the operating system 350 of) the compute node 300 to the first storage provisioning node 200 in the manner described earlier with reference to FIGS. 7 and 8.

As illustrated by block 706 of FIG. 13, the unencrypted storage volume 370 is provisioned by (e.g. the operating system 350 of) the compute node 300 to make the unencrypted storage volume 370 available at the compute node 300 to the first storage provisioning node 200 in the manner described earlier with reference to FIGS. 9 and 10. The unencrypted storage volume 370 is made available at the compute node 300 to the first storage provisioning node 200 for the first storage provisioning node 200 to use in the generation of an encrypted storage volume 360. In some embodiments, as illustrated by arrow 906 of FIG. 13, the second request may be acknowledged by the second storage provisioning node 510 to the first storage provisioning node 200.

In response to the requested unencrypted storage volume 370 becoming available to the first storage provisioning node 200, an encrypted storage volume 360 is generated by the first storage provisioning node 200 from the unencrypted storage volume 370 in the manner described earlier with reference to FIGS. 5 and 6. As described earlier and as illustrated at block 908 of FIG. 13, in some embodiments, an encryption layer may be provided by the first storage provisioning node 200 (or any other node) for use in generating the encrypted storage volume 360.

As illustrated by arrow 910 of FIG. 13, in the manner described earlier with reference to FIGS. 5 and 6, provisioning of the encrypted storage volume 360 is initiated by the first storage provisioning node 200 to make the encrypted storage volume 360 available at the compute node 300 for use by the application node 100 or, more specifically, a storage consumer 120 (e.g. a user, an application, or any other storage consumer) of the application node 100.

As illustrated by block 912 of FIG. 13, in the manner described earlier with reference to FIGS. 9 and 10, the encrypted storage volume 360 generated by the first storage provisioning node 200 is provisioned by (e.g. the operating system 350 of) the compute node 300 to make the encrypted storage volume 360 available at the compute node 300 for use by the application node 100 or, more specifically, the storage consumer 120 of the application node 100.

In some embodiments, the orchestrator 400 may transmit a request towards the (e.g. operating system 350 of the) compute node 300 for the creation of the application node 100 (as illustrated by arrow 710 of FIG. 13). The (e.g. operating system 350 of the) compute node 300 may then transmit the request for the application node 100 to start (as illustrated by arrow 712 of FIG. 12). Once started, the application node 100 may use (or consume) the encrypted storage volume (as illustrated by block 714 of FIG. 13).

Figure 14:
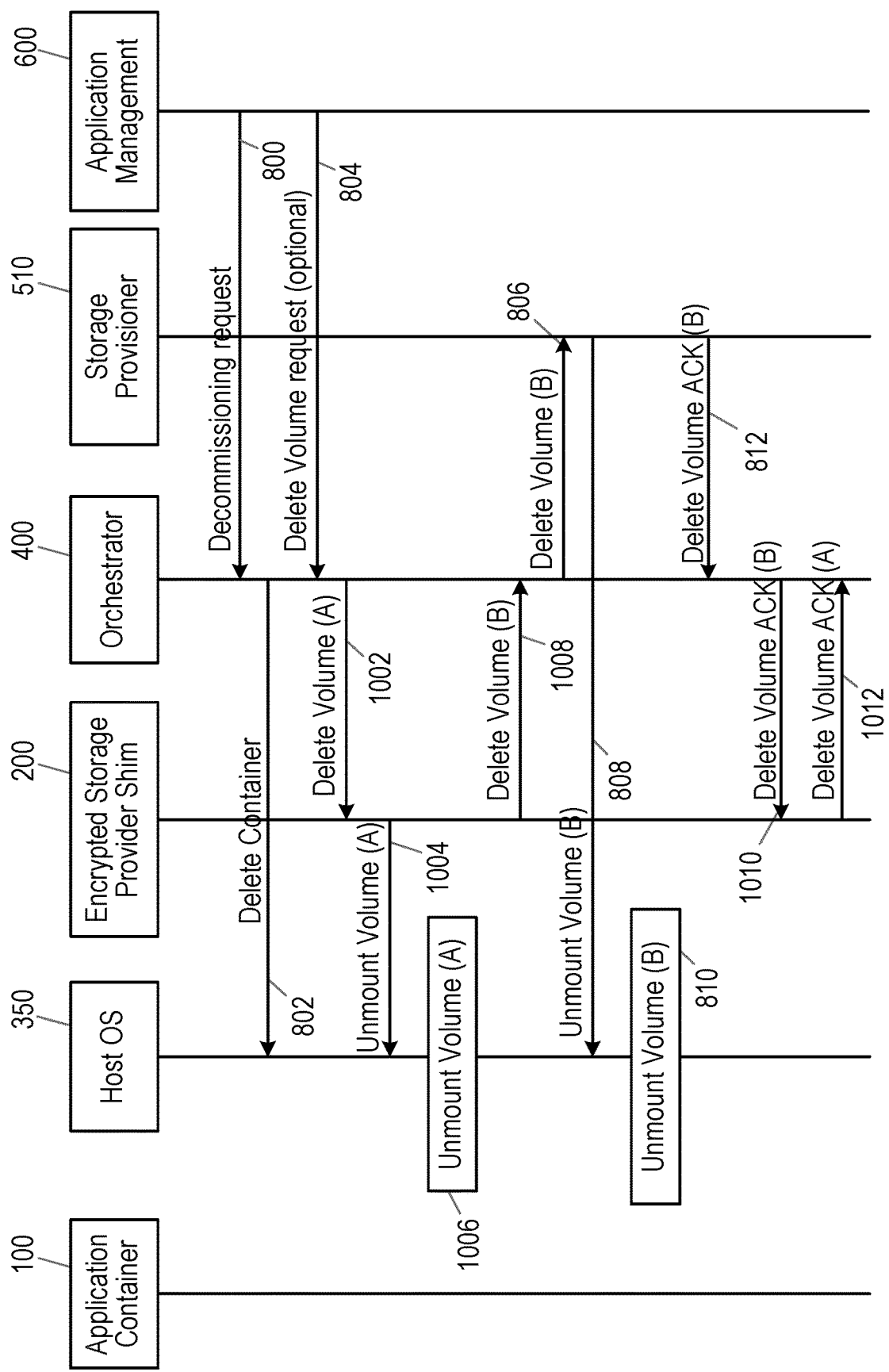
FIG. 14 is a signalling diagram illustrating an exchange of signals in a system according to an embodiment.

FIG. 14 is a signalling (or call flow) diagram illustrating an exchange of signals in a system according to an embodiment. The system may be as illustrated in FIG. 11 or 12 according to some embodiments. As illustrated in FIG. 14, the system comprises the application node 100, the operating system (OS) 350 of the compute node 300, the first storage provisioning node 200, the orchestrator 400, and the second storage provisioning node 510. The system illustrated in FIG. 14 also comprises an application management node 600. The application management node 600 may be implemented in hardware and/or software, which is not shown.

Figure 4:
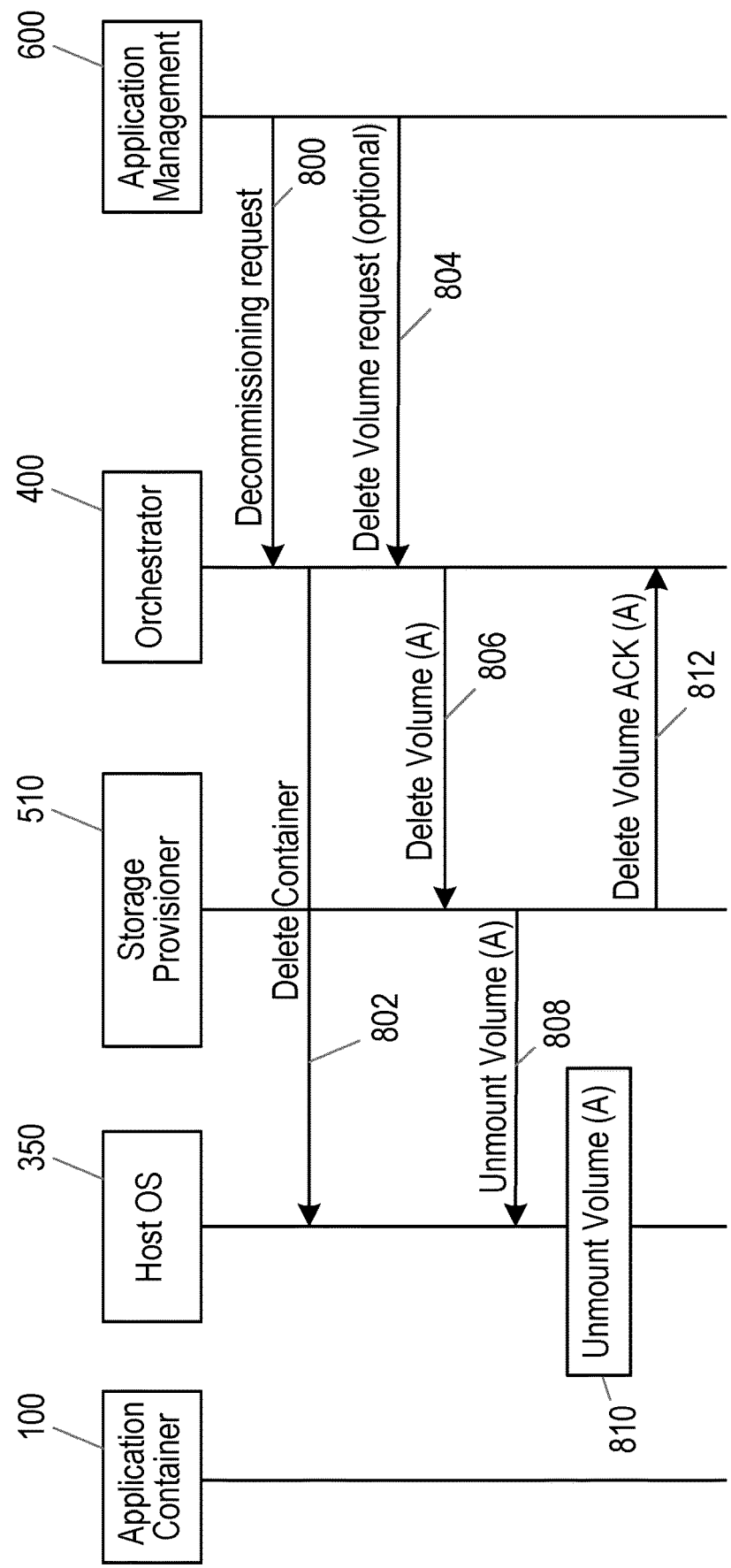
FIG. 4 is a signalling diagram illustrating an exchange of signals in an existing system.

In the embodiment of FIG. 14, as illustrated, the steps 800, 802, 804, 806, 808, 810 and 812 may be performed in the manner described earlier with reference to FIG. 4. The corresponding description of these steps with reference to FIG. 4 will thus be understood to also apply to FIG. 14, even if they are not repeated here. However, at step 810 of FIG. 14, the unencrypted storage volume 370 is made unavailable to the first storage provisioning node 200 (rather than to the application node 100 as it is at step 810 of FIG. 4). Also, additional steps 1002, 1004, 1006, 1008, 1010, and 1012 may also be performed according to the embodiment illustrated in FIG. 14. In some embodiments, the method illustrated in FIG. 14 may be performed subsequent to the method illustrated in FIG. 13.

With reference to FIG. 14, in response to a (fourth) request to cease making the encrypted storage volume 360 available at the compute node 300 (as illustrated by arrow 1002 of FIG. 14), the ceasing of making the encrypted storage volume 360 available at the compute node 300 may be initiated by the first storage provisioning node 200 as illustrated by arrow 1004 of FIG. 14 in the manner described earlier with reference to FIGS. 5 and 6. The (fourth) request to cease making the encrypted storage volume 360 available at the compute node 300, as illustrated by arrow 1002 of FIG. 14, may be from the orchestrator 400. As illustrated at block 1006 of FIG. 14, the compute node 300 (e.g. the operating system 350 of the compute node 300) may cease to make the encrypted storage volume 360 available at the compute node 300 in the manner described earlier with reference to FIGS. 9 and 10.

As illustrated by arrows 1008 and 806 of FIG. 14, transmission of a (third) request may be initiated by the first storage provisioning node 200 towards the second storage provisioning node 510 (e.g. via the orchestrator 400) to cease making the unencrypted storage volume 370 available at the compute node 300. As illustrated by arrow 808 of FIG. 14, in response to the (third) request from the first storage provisioning node 200 to cease making the unencrypted storage volume 370 available at the compute node 300, the ceasing of making the unencrypted storage volume 370 available at the compute node 300 may be initiated by the second storage provisioning node 510 in the manner described earlier with reference to FIGS. 7 and 8. As illustrated at block 810 of FIG. 14, the compute node 300 (e.g. the operating system 350 of the compute node 300) may cease to make the unencrypted storage volume 370 available at the compute node 300 in the manner described earlier with reference to FIGS. 9 and 10.

As illustrated by arrows 812 and 1010 of FIG. 14, in some embodiments, the (third) request to cease making the unencrypted storage volume 370 available at the compute node 300 may be acknowledged by the second storage provisioning node 510 to the first storage provisioning node 200, e.g. via the orchestrator 400. As illustrated by arrow 1012 of FIG. 14, in some embodiments, the (fourth) request to cease making the encrypted storage volume 360 available at the compute node 300 may be acknowledged by the first storage provisioning node 200 to the orchestrator 400.

In some embodiments, the method described herein in respect of the first storage provisioning node 200, the second storage provisioning node 510 and/or the compute node 300 may be performed (e.g. may run to completion) prior to initiation of the application node 100, e.g. prior to the application node 100 starting (or booting up). In this way, the encrypted storage volume 360 is available at the compute node 300 for use by the application node 100 before the application node 100 is initiated, e.g. started (or booted up). In other embodiments, the application node 100 may be initiated, e.g. started (or booted up), before encrypted storage volume 360 is available at the compute node 300. In some of these embodiments, the application node 100 (e.g. processing circuitry of the application node 100) may be configured to check whether the encrypted storage volume 360 is available at the compute node 300. In some embodiments, the check may be performed by the application node 100 (e.g. processing circuitry of the application node 100) polling the compute node 300. The check may be performed, for example, continuously or at predefined time intervals. In some embodiments, the orchestrator 400 may be configured to initiate, e.g. start (or boot up) the application node 100.

Figure 15:
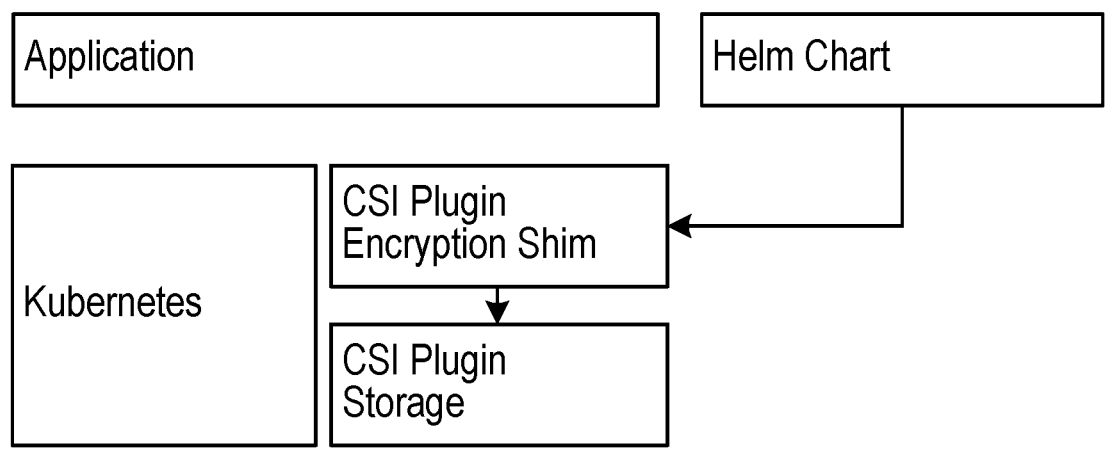
FIG. 15 is a block diagram illustrating an example environment for a system according to an embodiment.

FIG. 15 illustrates an example environment in which a system (such as those described earlier) can be deployed in accordance with an embodiment. As illustrated in FIG. 15, the example environment comprises a Kubernetes (which may also be referred to as a k8s) system, which can function as an orchestrator. The example environment also comprises a container storage interface (CSI) encryption shim plugin, a CSI storage plugin, and a helm chart. The environment also comprises an application that requires data storage. The method described herein can be used to provision this data storage. The first storage provisioning node 200 described herein can be used as the CSI encryption shim plugin. In the example environment, the application node 100 may select, e.g. via the helm chart, the type of storage that is provided by the second storage provisioning node 510.

Figure 16:
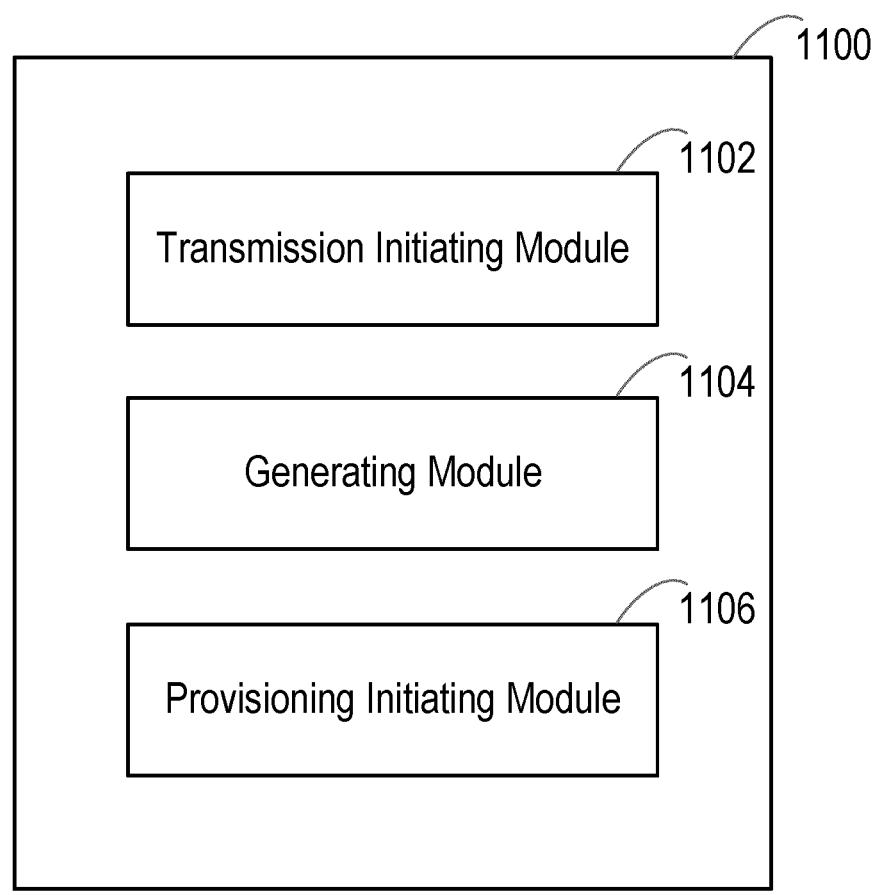
FIG. 16 is a block diagram illustrating a first storage provisioning node according to an embodiment.

FIG. 16 is a block diagram illustrating a first storage provisioning node 1100 in accordance with an embodiment. The first storage provisioning node 1100 comprises a transmission initiating module 1102 configured to, in response to a first request for an encrypted storage volume for an application node, initiate transmission of a second request towards a second storage provisioning node for an unencrypted storage volume. The first storage provisioning node 1100 comprises a generating module 1104 configured to, in response to the requested unencrypted storage volume becoming available to the first storage provisioning node, generate an encrypted storage volume from the unencrypted storage volume. The first storage provisioning node 1100 comprises a provisioning initiating module 1106 configured to initiate provisioning of the encrypted storage volume to make the encrypted storage volume available at a compute node of the system for use by the application node. The first storage provisioning node 1100 may operate in the manner described herein.

Figure 17:
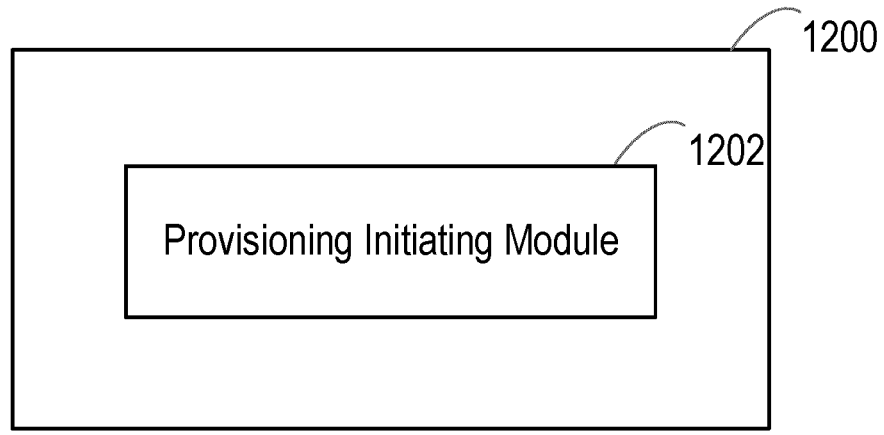
FIG. 17 is a block diagram illustrating a second storage provisioning node according to an embodiment.

FIG. 17 is a block diagram illustrating a second storage provisioning node 1200 in accordance with an embodiment. The second storage provisioning node 1200 comprises a provisioning initiating module 1202 configured to, in response to a second request from a first storage provisioning node 1100 of the system for an unencrypted storage volume, initiate provisioning of the unencrypted storage volume to make the unencrypted storage volume available at a compute node of the system to the first storage provisioning node 1100 for the first storage provisioning node 1100 to use in the generation of an encrypted storage volume to be made available at the compute node for use by an application node. In some embodiments, the second storage provisioning node 1200 may also comprise an unprovisioning initiating module configured to initiate unprovisioning of the unencrypted storage volume to cease making the unencrypted storage volume available at the compute node. The second storage provisioning node 1200 may operate in the manner described herein.

Figure 18:
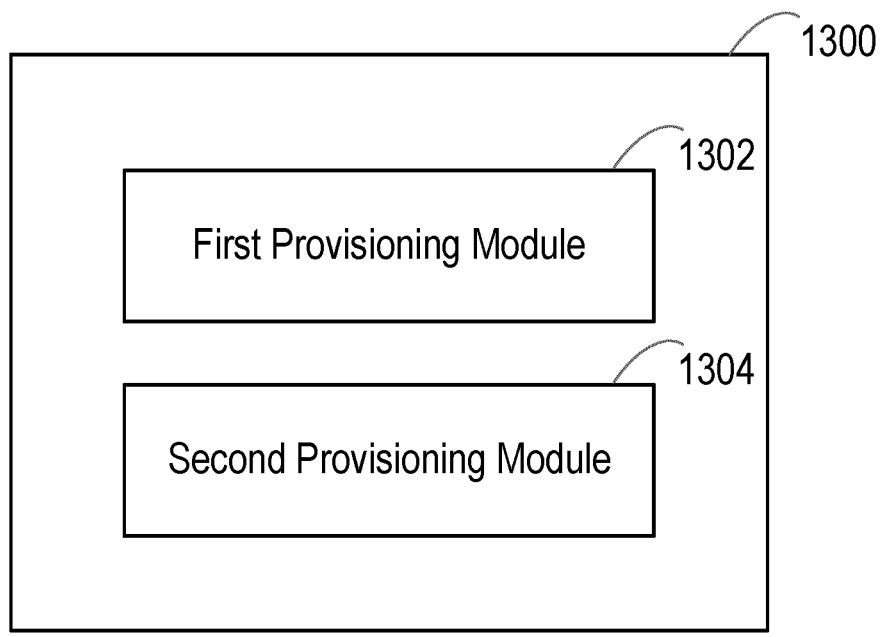
FIG. 18 is a block diagram illustrating a compute node according to an embodiment.

FIG. 18 is a block diagram illustrating a compute node 1300 in accordance with an embodiment. The compute node 1300 comprises a first provisioning module 1302 configured to provision an unencrypted storage volume requested by a first storage provisioning node 1100 to make the unencrypted storage volume available at the compute node to the first storage provisioning node 1100 for the first storage provisioning node 1100 to use in the generation of an encrypted storage volume. The compute node 1300 comprises a second provisioning module 1304 configured to provision the encrypted storage volume generated by the first storage provisioning node 1100 to make the encrypted storage volume available at the compute node for use by an application node. In some embodiments, the compute node 1300 may also comprise an unprovisioning module configured to unprovision the unencrypted storage volume to cease making the unencrypted storage volume available at the compute node. The compute node 1300 may operate in the manner described herein.

There is also provided a computer program comprising instructions which, when executed by processing circuitry (such as the processing circuitry 202 of the first storage provisioning node 200 described earlier, the processing circuitry 502 of the second storage provisioning node 510 described earlier, and/or the processing circuitry 310 of the compute node 300 described earlier), cause the processing circuitry to perform at least part of the method described herein. There is provided a computer program product, embodied on a non-transitory machine-readable medium, comprising instructions which are executable by processing circuitry (such as the processing circuitry 202 of the first storage provisioning node 200 described earlier, the processing circuitry 502 of the second storage provisioning node 510 described earlier, and/or the processing circuitry 310 of the compute node 300 described earlier) to cause the processing circuitry to perform at least part of the method described herein. There is provided a computer program product comprising a carrier containing instructions for causing processing circuitry (such as the processing circuitry 202 of the first storage provisioning node 200 described earlier, the processing circuitry 502 of the second storage provisioning node 510 described earlier, and/or the processing circuitry 310 of the compute node 300 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first storage provisioning node functionality, the second storage provisioning node functionality, and/or the compute node functionality described herein can be performed by hardware. Thus, in some embodiments, any one or more of the first storage provisioning node 200, the second storage provisioning node 510, and the compute node 300 described herein can be a hardware node. However, it will also be understood that optionally at least part or all of the first storage provisioning node functionality, the second storage provisioning node functionality, and/or the compute node functionality described herein can be virtualized. For example, the functions performed by any one or more of the first storage provisioning node 200, the second storage provisioning node 510, and the compute node 300 described herein can be implemented in software running on generic hardware that is configured to orchestrate the node functionality. Thus, in some embodiments, the any one or more of the first storage provisioning node 200, the second storage provisioning node 510, and the compute node 300 described herein can be a virtual node. In some embodiments, at least part or all of the first storage provisioning node functionality, the second storage provisioning node functionality, and/or the compute node functionality described herein may be performed in a network enabled cloud. The first storage provisioning node functionality, the second storage provisioning node functionality, and/or the compute node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided a technique for provisioning storage in a system. The first storage provisioning node 200 described herein can be deployed in any type of system including, but not limited to, any cloud system, such as any cloud system that provides a supported interface for storage provisioner plugins. The first storage provisioning node 200 described herein can fill the gap of other functionality, such as metrics, that existing cloud storage providers do not support. The second storage provisioning node 510 described herein can be any type of storage provisioning node including, but not limited to, any cloud system storage provisioner. The method described herein can be used with any workload that requires storage. Moreover, software support on the storage user side is not required.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first storage provisioning node of a system for provisioning storage in the system, the method comprising:
   in response to a first request for an encrypted storage volume for an application node, initiating transmission of a second request towards a second storage provisioning node for an unencrypted storage volume; and
   in response to the requested unencrypted storage volume becoming available to the first storage provisioning node, generating an encrypted storage volume from the unencrypted storage volume and initiating provisioning of the encrypted storage volume to make the encrypted storage volume available at a compute node of the system for use by the application node.

2. The method of claim 1, wherein initiating provisioning of the encrypted storage volume comprises initiating mounting of the encrypted storage volume to the compute node to make the encrypted storage volume available at the compute node for use by the application node.

3. The method of claim 2, wherein initiating mounting of the encrypted storage volume to the compute node comprises initiating mounting of the encrypted storage volume to a directory tree of the compute node.

4. The method of claim 1, wherein initiating provisioning of the encrypted storage volume comprises initiating provisioning of the encrypted storage volume on the first storage provisioning node to make the encrypted storage volume available at the compute node.

5. The method of claim 1, further comprising initiating transmission of a third request towards the second storage provisioning node to cease making the unencrypted storage volume available at the compute node.

6. The method of claim 1, further comprising, in response to a fourth request to cease making the encrypted storage volume available at the compute node, initiating the ceasing of making the encrypted storage volume available at the compute node.

7. The method of claim 1, wherein the encrypted storage volume is generated by applying an encrypted layer to the unencrypted storage volume.

8. The method of claim 7, wherein the encrypted layer is an encrypted file system layer.

9. A first storage provisioning node of a system, the first storage provisioning node comprising:
   processing circuitry configured to:
      in response to a first request for an encrypted storage volume for an application node, initiate transmission of a second request towards a second storage provisioning node for an unencrypted storage volume; and
      in response to the requested unencrypted storage volume becoming available to the first storage provisioning node, generate an encrypted storage volume from the unencrypted storage volume and initiate provisioning of the encrypted storage volume to make the encrypted storage volume available at a compute node of the system for use by the application node.

10. The first storage provisioning node of claim 9, wherein the processing circuitry is configured to initiate provisioning of the encrypted storage volume by initiating mounting of the encrypted storage volume to the compute node to make the encrypted storage volume available at the compute node for use by the application node.

11. The first storage provisioning node of claim 10, wherein the processing circuitry is configured to initiate mounting of the encrypted storage volume to the compute node by initiating mounting of the encrypted storage volume to a directory tree of the compute node.

12. The first storage provisioning node of claim 11, wherein the processing circuitry is configured to initiate provisioning of the encrypted storage volume by initiating provisioning of the encrypted storage volume on the first storage provisioning node to make the encrypted storage volume available at the compute node.

13. The first storage provisioning node of claim 11, wherein the processing circuitry is further configured to initiate transmission of a third request towards the second storage provisioning node to cease making the unencrypted storage volume available at the compute node.

14. The first storage provisioning node of claim 11, wherein the processing circuitry is further configured to, in response to a fourth request to cease making the encrypted storage volume available at the compute node, initiate the ceasing of making the encrypted storage volume available at the compute node.

15. The first storage provisioning node of claim 11, wherein the encrypted storage volume is generated by applying an encrypted layer to the unencrypted storage volume.

16. The first storage provisioning node of claim 15, wherein the encrypted layer is an encrypted file system layer.

17. A second storage provisioning node of a system for provisioning storage in the system, the second storage provisioning node comprising:
processing circuitry configured to, in response to a second request from a first storage provisioning node of the system for an unencrypted storage volume, initiate provisioning of the unencrypted storage volume to make the unencrypted storage volume available at a compute node of the system to the first storage provisioning node for the first storage provisioning node to use in the generation of an encrypted storage volume to be made available at the compute node for use by an application node.

18. The second storage provisioning node of claim 17, wherein the processing circuitry is configured to initiate provisioning of the unencrypted storage volume by initiating mounting of the unencrypted storage volume to the compute node to make the unencrypted storage volume available to the first storage provisioning node.

19. A compute node of a system for provisioning storage in the system, the compute node comprising:
processing circuitry configured to:
provision an unencrypted storage volume requested by a first storage provisioning node to make the unencrypted storage volume available at the compute node to the first storage provisioning node for the first storage provisioning node to use in the generation of an encrypted storage volume; and
provision the encrypted storage volume generated by the first storage provisioning node to make the encrypted storage volume available at the compute node for use by an application node.

20. The compute node of claim 19, wherein the processing circuitry is configured to:
provision the unencrypted storage volume by generating a container on which to make the unencrypted storage volume available at the compute node; and/or
provision the encrypted storage volume by provisioning the encrypted storage volume on the first storage provisioning node to make the encrypted storage volume available at the compute node.

* * * * *